United States Patent
Li et al.

(10) Patent No.: US 11,461,699 B2
(45) Date of Patent: Oct. 4, 2022

(54) DEVICE-FREE LOCALIZATION ROBUST TO ENVIRONMENTAL CHANGES

(71) Applicant: SAMSUNG ELECTRONICS CO., LTD., Suwon-si (KR)

(72) Inventors: Hang Li, Montreal (CA); Xi Chen, Montreal (CA); Di Wu, Montreal (CA); Xue Liu, Montreal (CA)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 53 days.

(21) Appl. No.: 17/008,218

(22) Filed: Aug. 31, 2020

(65) Prior Publication Data

US 2021/0241173 A1    Aug. 5, 2021

Related U.S. Application Data

(60) Provisional application No. 62/970,345, filed on Feb. 5, 2020.

(51) Int. Cl.
| | |
|---|---|
| *G06N 20/00* | (2019.01) |
| *H04W 4/02* | (2018.01) |
| *G01S 5/02* | (2010.01) |
| *G06N 5/04* | (2006.01) |
| *G01P 13/00* | (2006.01) |
| *H04W 84/12* | (2009.01) |

(52) U.S. Cl.
CPC ............. *G06N 20/00* (2019.01); *G01P 13/00* (2013.01); *G01S 5/0284* (2013.01); *G06N 5/04* (2013.01); *H04W 4/02* (2013.01); *H04W 84/12* (2013.01)

(58) Field of Classification Search
CPC .......... G06N 20/00; G06N 5/04; G01P 13/00; G01S 5/0284; H04W 4/02
See application file for complete search history.

(56) References Cited

U.S. PATENT DOCUMENTS

| | | |
|---|---|---|
| 9,915,722 B2 | 3/2018 | Huang et al. |
| 2015/0142808 A1 | 5/2015 | Ren et al. |
| 2015/0237471 A1 | 8/2015 | Li et al. |

(Continued)

FOREIGN PATENT DOCUMENTS

| | | |
|---|---|---|
| CN | 105137389 B | 4/2018 |
| WO | 2020/008365 A2 | 1/2020 |

OTHER PUBLICATIONS

Communication dated Apr. 21, 2021 issued by the International Searching Authority in counterpart Application No. PCT/KR2021/000684 (PCT/ISA/220, PCT/ISA/210, and PCT/ISA/237).

(Continued)

*Primary Examiner* — Curtis B Odom
(74) *Attorney, Agent, or Firm* — Sughrue Mion, PLLC

(57) ABSTRACT

A method of location determination with a WiFi transceiver and an AI model includes jointly training, based on various losses: a feature extractor, a location classifier, and a domain classifier. The domain classifier may include a first domain classifier and a second domain classifier. The losses used for training tend to cause feature data from the feature extractor to cluster even if a physical object in an environment has moved after training is completed. Then, the location classifier is able to accurately estimate the position of, for example, a person in a room, even if a door or window has changed from open to close or close to open between the time of training and the time of estimating the person's position.

29 Claims, 30 Drawing Sheets

(56) References Cited

U.S. PATENT DOCUMENTS

2018/0356491 A1 12/2018 Das et al.
2020/0053559 A1 2/2020 Kim et al.

OTHER PUBLICATIONS

Shabir Abdul Samadh et al., "Indoor Localization based on Channel State Information", 2019 IEEE Topical Conference on Wireless Sensors and Sensor Networks (WiSNet), Jan. 23, 2019, 6 pages total.
Kam, T.,"Random Decision Forests", Proceedings of the 3rd International Conference on Document Analysis and Recognition, vol. 1416, 1995, pp. 278-282.
Chen, Xi., et al., "Taming the Inconsistency of Wi-Fi Fingerprints for Device-Free Passive Indoor Localization", IEEE Infocom, 2017, 9 pages.
Ganin, Y., et al., "Domain-Adversarial Training of Neural Networks", Journal of Machine Learning Research, vol. 17, No. 59, 2016, pp. 1-35.
Pan, S., et al., "Domain Adaptation via Transfer Component Analysis", IEEE Transactions on Neural Networks, vol. 22, No. 2, 2010, 6 pages.
Ma, X., et al.," GCAN: Graph Convolutional Adversarial Network for Unsupervised Domain Adaptation", CVF, IEEE Xplore, 2019, pp. 8266-8276.

Logic 1-3

Example Algorithm and Application:

- Step 1. Training phase: collect labelled data XLabelled positions pi (x,y,z geography).
- Step 2. Training phase: Observe WiFi CSI data, XU, no labels.
- Step 3. Apply clustering and probability measures,
  - Reduce entropy of features placed in unlabeled domain.
- Step 4. Separate clusters, nearest XL indicating what XU corresponds to in x, y, z.
- Step 5. Application phase: collect WiFi CSI data X.
- Step 6. Apply predictor to X (estimate location in environment).
- Step 7. Repeat Steps 5-6 several times over a few seconds.
- Step 8. Estimate location, motion, heading direction and speed.
- Step 9. Display location, motion heading direction and speed on TV and/or use in application such as virtual reality or another application (see FIGS. 7A-7F).

FIG. 1E

Logic 4-0

4-1 Jointly train the system of FIG. 1A, based on a cross-domain loss, a clustering loss, and a triplet loss, including training:
a feature extractor comprising at least a feature extraction layer of the AI model,
a location classifier comprising at least a location classifier layer of the AI model, and
a domain classifier comprising at least a domain classifier layer of the AI model;

4-2 First data is input (CSI data), the classifier predicts a first location of a person in a physical space.

4-3 The physical space is changed in some way to a second environment of the physical space (target domain).

Logic 5-0

5-1 Jointly train the system of FIG. 1A, based on a cross-domain loss, a clustering loss, and a triplet loss, including training:
a feature extractor comprising at least a feature extraction layer of the AI model,
a location classifier comprising at least a location classifier layer of the AI model, and
a first domain classifier and a second domain classifier of the AI model;

5-2 First data is input (CSI data), the classifier predicts a first location of a person in a physical space.

5-3 The physical space is changed in some way to a second environment of the physical space (target domain).

Experiments - Accuracy

| | door open → close | | door close → open | | shutter open → close | | shutter close → open | |
|---|---|---|---|---|---|---|---|---|
| | source | target | source | target | source | target | source | target |
| RF | 0.940 | 0.586 | 0.946 | 0.612 | 0.947 | 0.358 | 0.970 | 0.378 |
| TCA | 1.000 | 0.563 | 1.000 | 0.614 | 1.000 | 0.426 | 1.000 | 0.540 |
| AutoFi | 0.817 | 0.708 | 0.831 | 0.662 | 0.894 | 0.534 | 0.897 | 0.594 |
| DANN | 0.918 | 0.642 | 0.918 | 0.673 | 0.910 | 0.657 | 0.886 | 0.599 |
| DAFI | 0.913 | 0.815 | 0.891 | 0.746 | 0.905 | 0.859 | 0.886 | 0.737 |

Table 1: Experimental results of two domain scenarios. For example, shutter open → close means we treat the shutter open as the source domain and close as the target domain. The result is the average accuracy over all locations.

FIG. 6E

| Method | s1→s2 | | s2→s3 | | s3→s4 | | s2→s1 | | s3→s2 | | s4→s3 | |
|---|---|---|---|---|---|---|---|---|---|---|---|---|
| | source | target | source | target | source | target | source | target | source | target | source | target |
| RF | 0.927 | 0.554 | 0.934 | 0.298 | 0.936 | 0.298 | 0.934 | 0.610 | 0.968 | 0.210 | 0.989 | 0.357 |
| TCA | 0.990 | 0.573 | 0.990 | 0.381 | 0.990 | 0.367 | 0.990 | 0.608 | 0.990 | 0.273 | 0.990 | 0.425 |
| AutoEn | 0.927 | 0.652 | 0.934 | 0.644 | 0.956 | 0.661 | 0.934 | 0.667 | 0.968 | 0.346 | 0.969 | 0.727 |
| DANN | 0.942 | 0.808 | 0.975 | 0.836 | 0.979 | 0.703 | 0.971 | 0.738 | 0.984 | 0.706 | 0.985 | 0.770 |
| ADDA | 0.973 | 0.982 | 0.989 | 0.765 | 0.987 | 0.747 | 0.964 | 0.672 | 0.980 | 0.776 | 0.987 | 0.770 |
| DAFI | 0.965 | 0.982 | 0.973 | 0.933 | 0.976 | 0.905 | 0.970 | 0.830 | 0.985 | 0.850 | 0.982 | 0.800 |

[Table 2: Experimental accuracy results. As an example, s1→s2 means we treat the s1 as the source domain and s2 as the target domain. The result is the average accuracy over all locations.

DEVICE-FREE LOCALIZATION ROBUST TO ENVIRONMENTAL CHANGES

CROSS-REFERENCE TO RELATED APPLICATION

This application claims benefit of U.S. Provisional Patent Application No. 62/970,345, entitled "System and Method for Device-free Indoor Localization," filed on Feb. 5, 2020, in the U.S. Patent and Trademark Office, the disclosure of which is incorporated by reference herein.

This application is related to U.S. patent application Ser. No. 16/913,493, entitled "SYSTEM AND METHOD FOR WIFI-BASED INDOOR LOCALIZATION VIA UNSUPERVISED DOMAIN ADAPTATION," filed on Jun. 26, 2020, assigned to the same assignee as the present application; the contents of U.S. patent application Ser. No. 16/913,493 are incorporated by reference herein.

BACKGROUND OF THE INVENTION

The disclosure relates to location-aware applications, and more particularly, an electronic device for location-aware applications and an operating method thereof. Some embodiments relate to WiFi (also called "Wi-Fi" in the communications industry).

DESCRIPTION OF RELATED ART

Indoor localization systems help deliver a smart environment that is sensitive and responsive to the locations of human. To better support the emerging context-aware applications, such as cashier-free shopping and location-aware Augmented Reality (AR), fine-grained location information needs to be delivered to anyone at anytime and anywhere. To this end, existing WiFi infrastructure has been utilized to create localization systems, mainly due to the ubiquitousness of WiFi signals indoor. By triangulating a dedicated WiFi-enabled device or a smartphone carried by a user, the device-oriented WiFi localization approaches can achieve a decimeter-level resolution.

SUMMARY OF THE INVENTION

Provided herein is a method of location determination by a system including an electronic device with a WiFi transceiver and an AI model, the method including: jointly training, based on a cross-domain loss, a clustering loss, and a triplet loss: a feature extractor including at least a feature extraction layer of the AI model, a location classifier including at least a location classifier layer of the AI model, and a domain classifier including at least a domain classifier layer of the AI model; classifying, using the location classifier layer of the AI model and based on a first set of feature data from the feature extraction layer, first channel state information (CSI) data to obtain a first estimated location label of a first person in a first environment; receiving, via the WiFi transceiver, second CSI data associated with a second person at the first physical location and a second environment; obtaining, using the feature extraction layer of the AI model and based on operating on the second CSI data, a second set of feature data; classifying, using the location classifier layer of the AI model and based on the second set of feature data from the feature extraction layer, the second CSI data to obtain a second estimated location label of the second person, and outputting, by a visible indication or an audible indication, a second indicator of the second estimated location label of the second person.

Also provided herein is an electronic device including: one or more memories, wherein the one or more memories comprise instructions; a WiFi transceiver; and one or more processors, wherein the one or more processors are configured to execute the instructions to: jointly train, based on a cross-domain loss, a clustering loss, and a triplet loss: a feature extractor including at least a feature extraction layer of the AI model, a location classifier including at least a location classifier layer of the AI model, and a domain classifier including at least a domain classifier layer of the AI model; classify, using the location classifier layer of the AI model and based on a first set of feature data from the feature extraction layer, first channel state information (CSI) data to obtain a first estimated location label of a first person in a first environment; receive, via the WiFi transceiver, second CSI data associated with a second person at the first physical location and a second environment; obtain, using the feature extraction layer of the AI model and based on operating on the second CSI data, a second set of feature data; classify, using the location classifier layer of the AI model and based on the second set of feature data from the feature extraction layer, the second CSI data to obtain a second estimated location label of the second person, and output, by a visible indication or an audible indication, a second indicator of the second estimated location label of the second person.

Also provided herein is a non-transitory computer-readable storage medium storing instructions configured to cause a processor to: jointly train, based on a cross-domain loss, a clustering loss, and a triplet loss: a feature extractor including at least a feature extraction layer of the AI model, a location classifier including at least a location classifier layer of the AI model, and a domain classifier including at least a domain classifier Jayer of the AI model; classify, using the location classifier layer of the AI model and based on a first set of feature data from the feature extraction layer, first channel state information (CSI) data to obtain a first estimated location label of a first person in a first environment; receive, via the WiFi transceiver, second CSI data associated with a second person at the first physical location and a second environment; obtain, using the feature extraction layer of the AI model and based on operating on the second CSI data, a second set of feature data; classify, using the location classifier layer of the AI model and based on the second set of feature data from the feature extraction layer, the second CSI data to obtain a second estimated location label of the second person, and output, by a visible indication or an audible indication, a second indicator of the second estimated location label of the second person.

BRIEF DESCRIPTION OF THE DRAWINGS

The above and other aspects, features, and aspects of embodiments of the disclosure will be more apparent from the following description taken in conjunction with the accompanying drawings, in which:

FIG. 1E is a logic flow of the classification system of FIG. 1A for determining location, motion, heading direction and speed, according to embodiments.

FIG. 4A and FIG. 4B illustrate a logic flow of the classification system of FIG. 1A finding a first gradient and a reversed gradient and using these for training, according to embodiments.

FIG. 5A and FIG. 5B illustrate a logic flow of the classification system of FIG. 1A using both a first domain classifier and a second domain classifier, according to embodiments.

FIG. 6E provides a comparison of accuracy of embodiments with benchmarks, according to embodiments.

FIG. 6I shows unprocessed data ("Origin"); FIG. 6J shows a benchmark ("DANN"), and FIG. 6K shows separation of points with two classifiers, a version of DAFI, according to embodiments.

DETAILED DESCRIPTION OF THE INVENTION

Figure 1A:
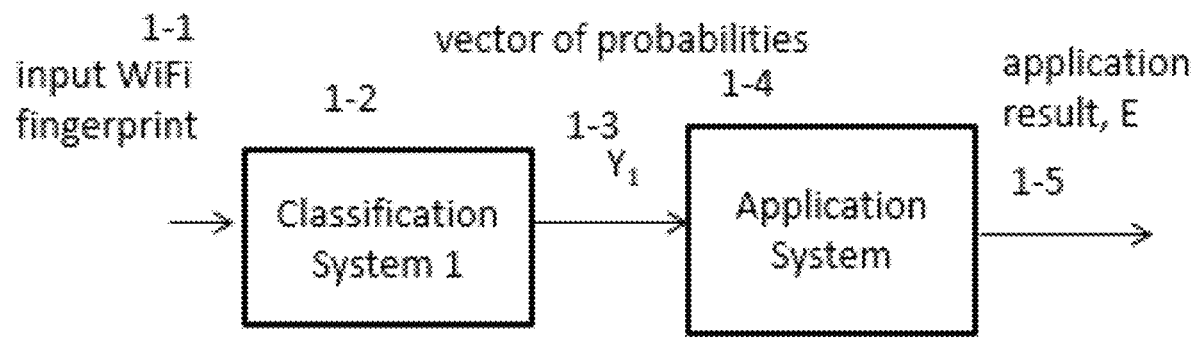
FIG. 1A is a block diagram of an apparatus for performing as a classification system and an application system, according to embodiments.

In order to relieve people from the burden of carrying devices, Device-free Passive (DfP) localization systems have been developed and deployed. Generally, these systems collect fingerprints that associate human locations with certain WiFi propagation characteristics, e.g., Channel State Information (CSI) or Received Signal Strength Indicator (RSSI). By training location classifiers/regressors with these collected fingerprints, DfP localization systems can also achieve a sub-meter-level localization resolution.

WiFi propagation is sensitive to not only human locations but also environment variations. As a result, a minor environment change (e.g., opening a window shutter or rotating a chair) can lead to an inconsistency between the recorded fingerprints and the new CSI readings. The localization accuracy may therefore degrade significantly. To address this inconsistency issue, existing solutions mainly focus on the data side. However, these data oriented approaches require certain labelling efforts to associate new CSI readings with ground truth locations. Such labelling processes are troublesome and sometimes imprecise.

Device-oriented approaches triangulate a device carried by a user, using information such as Received Signal Strength, Angle of Arrival (AoA) and Time of Flight (ToF) extracted from WiFi signals. However, device-oriented approaches require precise measurements of WiFi AP locations, and usually consume significant computing overhead during detection.

Device-free methods may adopt ML algorithms to automatically associate WiFi RSSI and CSI with real-time locations of human bodies. Some involve utilizing deep learning based methods, which require training data. The data-oriented approaches need to label the newly collected CSI readings. Such labelling processes are troublesome, time-consuming and usually imprecise.

Among all the readings of WiFi propagation characteristics, the CSI is the most informative and representative one. For example, the information contained in one CSI reading is at least 60 times more than that in an RSSI reading (which is another widely used reading). Next, the reasons are explained by discussing some related details of WiFi standards and their implementations on WiFi chips.

WiFi's physical layer follows the IEEE 802.11 standards, which employ the Orthogonal Frequency-Division Multiplexing (OFDM) technology to divide a WiFi frequency channel into 64 frequency subcarriers or even more. This increases the frequency efficiency, by supporting simultaneous transmission of multiple data signals on multiple orthogonal subcarriers. Furthermore, spatial multi-plexing is also supported by the standards. The signal flow between one antenna on the transmitter side to the other antenna on the receiver side is called a spatial stream, or stream for short.

The complex signal transmitted on the ith stream and the jth subcarrier may be denoted as $a_{i,j}$. This signal propagates through the WiFi channel, of which channel response is described as $h_{i,j}$. Being altered during the propagation, the signal finally arrives the receiver as $b_{i,j}$. In the frequency domain, this propagation process is modelled as an alteration of the transmitted signal.

As mentioned previously, a WiFi signal may travel through multiple paths to reach the receiver. Therefore, $h_j$ is in fact an additive representation of channel responses on multiple paths. To reconstruct $a_{i,j}$, the receiver has to reverse the propagation process by cancelling out $h_{i,j}$ from $b_{i,j}$.

In order to estimate every $h_j$, WiFi chips all implement certain algorithms, which report the estimation results as CSI readings. Take Intel 5300 WiFi chips as an example. For each spatial stream, these chips estimate complex-valued CSI values on 30 subcarriers, which correspond to 60 floating-point values in total. Extracing only 1 real-valued RSSI, which reflects the aggregated signal strength of all the subcarriers is less information. The CSI values contain more detailed information regarding the WiFi signal propagation, and thus can create location fingerprints with much higher resolution than other WiFi characteristics.

While being sensitive to human locations, WiFi CSI fingerprints (as well as RSSI and other fingerprints) are also sensitive to 1) human body shapes and 2) variations in the physical environment. In an example, while standing at the same location, a tall person blocks a WiFi propagation path 0, while a short person does not. At the same time, a big person absorbs more signal power on a path 1, while a small person absorbs less. Consequently, different WiFi CSI readings are observed for different users, even when they are standing at the same location. Another example on the impact of environment changes occurs where the same user is standing at the same location. When a door closes, it creates a propagation path 0 by reflecting the WiFi signals. Yet, when the door opens, this path disappears. As a result, the CSI readings are varied by environment changes, even when the same user is standing at the same location.

To solve this inconsistency issue and provide robust location information for different users in varying environments, embodiments provided here disclose a WiFi-based localization system based on domain-adaptation with cluster assumption, which is able to localize a new user in a changed environment without labelling any new data, and thus saves a huge amount of system calibration time and efforts.

To label a WiFi CSI reading, a reading needs to be associated with the ground-truth location, i.e., the position that the user stood when the reading was collected. However, a system is deployed, this ground-truth information is hard to gather. First, it is troublesome and unfriendly to request people to manual collect data and label them for a new user comes or an environment change. Second, installing an auxiliary system (e.g., LiDARs) is costly, and brings more challenges in synchronization, cross-modality alignment, etc.

Domain adaptation may be considered as a sub-field of transfer learning, which reuses the knowledge learnt from a data abundant domain (i.e., the source domain) to assist the understanding of a data-scarce domain. The Domain-Adversarial WiFi (DAFI) localization system treats the original environment as the source domain and the changed environment as the target domain. To retrofit and upgrade existing Domain-Adversarial Neural Networks (DANNs), DAFI embraces one or more of the following techniques. 1) Inside the target domain, DAFI squeezes the distribution of every class to be more concentrated at its center. 2) Between two domains, DAFI conducts fine-grained alignment by forcing every target-domain class to better align with its source-domain counterpart. By doing these, one embodiment increases the localization accuracy by up to 20.2% over the state of the art.

One embodiment employs a model-oriented approach, which requires no labelling effort after the environment varies. One embodiment of the DAFI localization system is based on a DANN that is tailored for WiFi localization. It treats CSI readings in the original environment as the source domain, and considers the counterpart in the changed/new environment as the target domain. It utilizes both the source-domain labelled data and the target-domain unlabeled data to train a feature extractor, which highlights the commonness between both domains while deemphasizing their differences.

Although small changes in the environment largely degrade localization accuracy, their corresponding variations in the CSI space are hard to discriminate. To address this challenge, the adversarial learning of DAFI goes beyond the domain-to-domain alignment and/or operations, and conducts class-level operations. DAFI employs one or more of the following techniques. (1) For each class in the target domain, DAFI concentrates its data distribution towards the center, so as to reduce the ambiguity across classes. (2) Between source and target domains, DAFI conduct fine-grained alignments by force each class in the target do-main to align with its counterpart in the source domain.

Experiments show that DAFI outperforms the state of the art in the target domain (i.e., in the changed environment), while maintaining a high accuracy in the source domain (i.e., the original environment).

Channel State Information (CSI) describes how WiFi signals propagate through an environment. By standing at different locations, a human body reflects and/or absorbs WiFi signals in different ways, and thus alter the CSI readings differently. By labelling these alterations and learning from the labelled data, one can tell the human locations.

In the description of the embodiments, detailed explanations of related art are omitted when it is deemed that they may unnecessarily obscure the essence of the disclosure. Also, numbers (for example, a first, a second, and the like) used in the description of the specification are identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module," two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an 'image' or a 'picture' may denote a still image, a moving image including a plurality of consecutive still images (or frames), or a video.

Also, in the present specification, a deep neural network (DNN) or CNN is a representative example of an artificial neural network model simulating brain nerves, and is not limited to an artificial neural network model using an algorithm.

Also, in the present specification, a 'parameter' is a value used in an operation process of each layer forming a neural network, and for example, may include a weight used when an input value is applied to an operation expression. Here, the parameter may be expressed in a matrix form. The parameter is a value set as a result of training, and may be updated through separate training data when necessary.

Throughout the disclosure, the expression "at least one of a, b or c" indicates only a, only b, only c, both a and b, both a and c, both b and c, all of a, b, and c.

As mentioned above, WiFi's physical layer follows the IEEE 802.11 standards, which employ the Orthogonal Frequency-Division Multiplexing (OFDM) technology to divide a WiFi frequency channel into 64 frequency subcarriers or even more. This increases the frequency efficiency, by sup-porting simultaneous transmission of multiple data signals on multiple orthogonal subcarriers. Furthermore, spatial multiplexing is also supported by the standards. Separate data signals can be transmitted from and/or to multiple antennas. The signal flow between one antenna on the transmitter side to the other antenna on the receiver side is called a spatial stream, or stream for short.

As mentioned above, the complex signal transmitted on the ith stream and the jth subcarrier may be denoted as $a_{i,j}$. This signal propagates through the WiFi channel, of which channel response is described as $h_{i,j}$. Being altered during the propagation, the signal finally arrives the receiver as $b_{i,j}$. In the frequency domain, this propagation process is modelled as an alteration of the transmitted signal, i.e., $$b_{i,j} = h_{i,j} \times a_{i,j}. \tag{1}$$

As mentioned previously, a WiFi signal may travel through multiple paths to reach the receiver. Therefore, hj is in fact an additive representation of channel responses on multiple paths. To reconstruct $a_{i,j}$, the receiver has to reverse the propagation process by cancelling out $h_{i,j}$ from $b_{i,j}$. In order to estimate every hj, WiFi chips all implement certain algorithms, which report the estimation results as CSI readings, for example, Intel 5300 WiFi chips. For each spatial stream, these chips estimate complex-valued CSI values on 30 subcarriers, which correspond to 60 floating-point values in total. CSI values contain more detailed information regarding the WiFi signal propagation than RSSI.

In some embodiments, a user interacts with an electronic device. The electronic device may be a television set (TV). The electronic device may include a classification system and application system. These together may be referred to below as "the system."

The system may ask a person if they are a new user. If the new user answers, for example, "yes, I am," the system may record data of the user and perform an update of various layers in order to support the user. In some embodiments the data is a user profile. Data of the user may include name, gender, height and weight. In some embodiments, the system may ask the user if the user wishes to create a new profile. If the new user answers, for example, "here is my profile," the system accepts the profile.

Embodiments provided herein provide a device-free localization service.

At a setup stage, an owner can collect WiFi CSI data (fingerprints) and label them with position labels.

After the setup, if the system is applied to a new user, the location accuracy if the new user may generally be lower than the accuracy with respect to the owner.

If more data of the new user is collected, the location accuracy of the new user increases. The new user does not need to label the newly collected data.

FIG. 1A illustrates an input WiFi CSI data 1-1 provided to a classification system 1 (item 1-2). The classification system 1 provides an output Y1 (item 1-3) which may be a vector of probabilities. Each element of the vector is associated with a position label, for example the position labels of FIG. 1B. Y1 is input to an application system 1-4 which provides an application result, E (item 1-5).

Figure 1B:
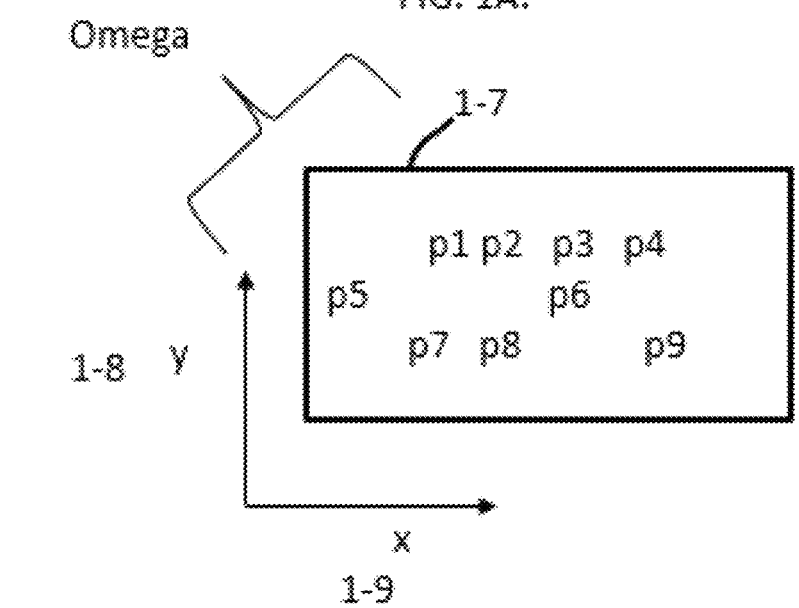
FIG. 1B is an illustration of a geographic area with exemplary position labels, according to embodiments.

FIG. 1B illustrates an environment 1-7. The environment may be for example, a room with a desk, chairs, doors, windows, etc. Within the environment, locations are associated with a set of labels Omega; Omega includes p1, p2, p3, p4, p5, p6, p7, p8, and p9 (these are exemplary). X coordinate 1-9 and y coordinate 1-8 are position coordinate axes.

The classification system 1 can process a fingerprint from a registered user or a guest (unknown user), and provide the output Y1. Y1 may then be processed by the application system to provide the application result, E. Thus FIGS. 1A and 1B are an overview of location-aware services to people.

Figure 1C:
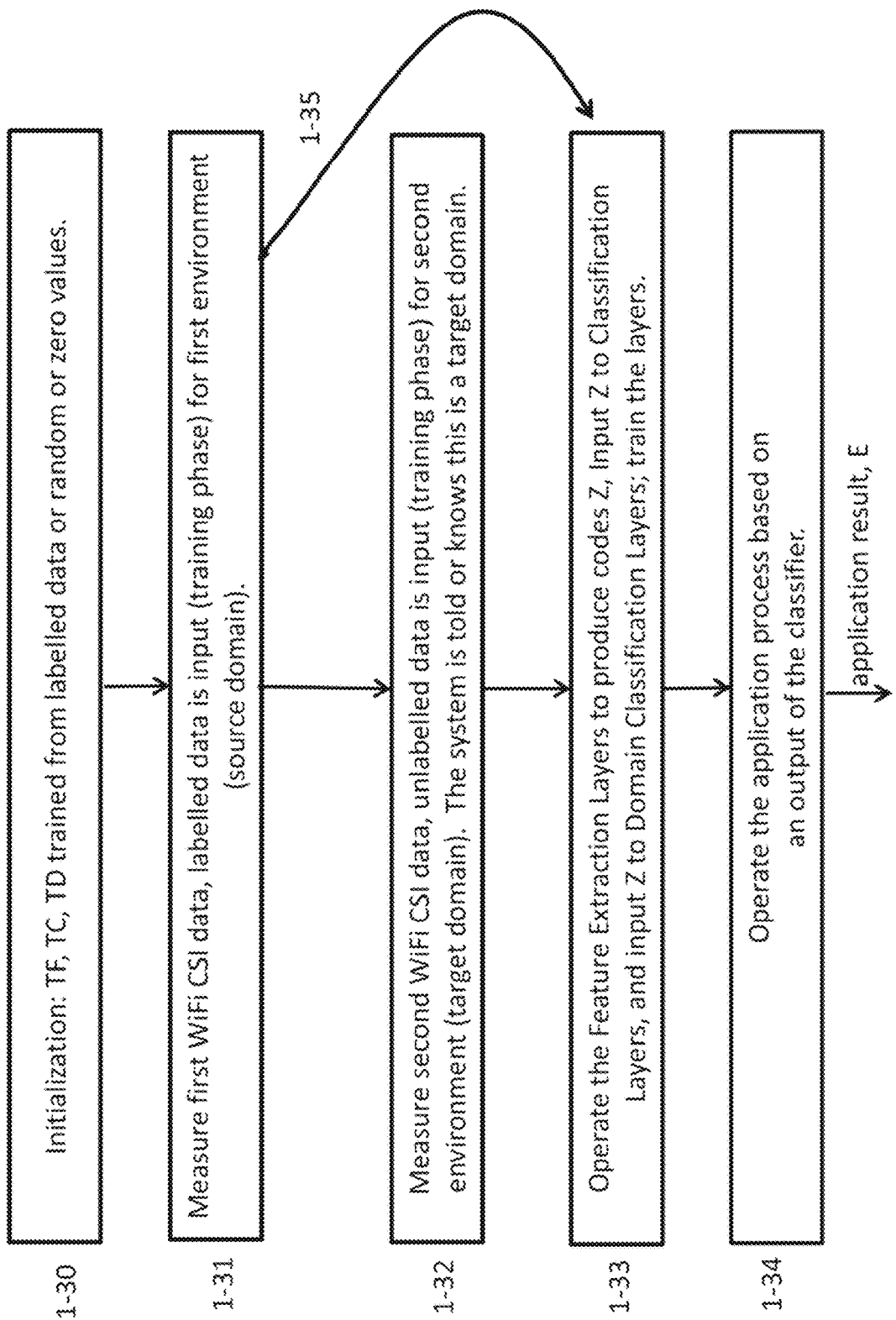
FIG. 1C is a logic flow of the classification system of FIG. 1A receiving labeled data for source and/or target domains and the application system of FIG. 1A providing an application result, according to embodiments.

FIG. 1C illustrates exemplary logic 1-1 associated with FIGS. 1A-1B. At 1-30 the system is initialized. At 1-31 first CSI data with a location label of a person is input. This data is for the first environment (for example a room with the furniture in default locations and orientations same for door and window shutter).

At 1-32 second CSI data with no location label of a person is input. Also a chair, door or window may have been moved or opened or closed. At 1-33 the feature extractor operates and produces codes (ZL for 1-31, ZU for 1-32). The classification layers and domain classification layers operate (this may directly follow 1-31 as shown by arrow).

At 1-34, an application process operates based on a classifier output and produces an application result.

Figure 1D:
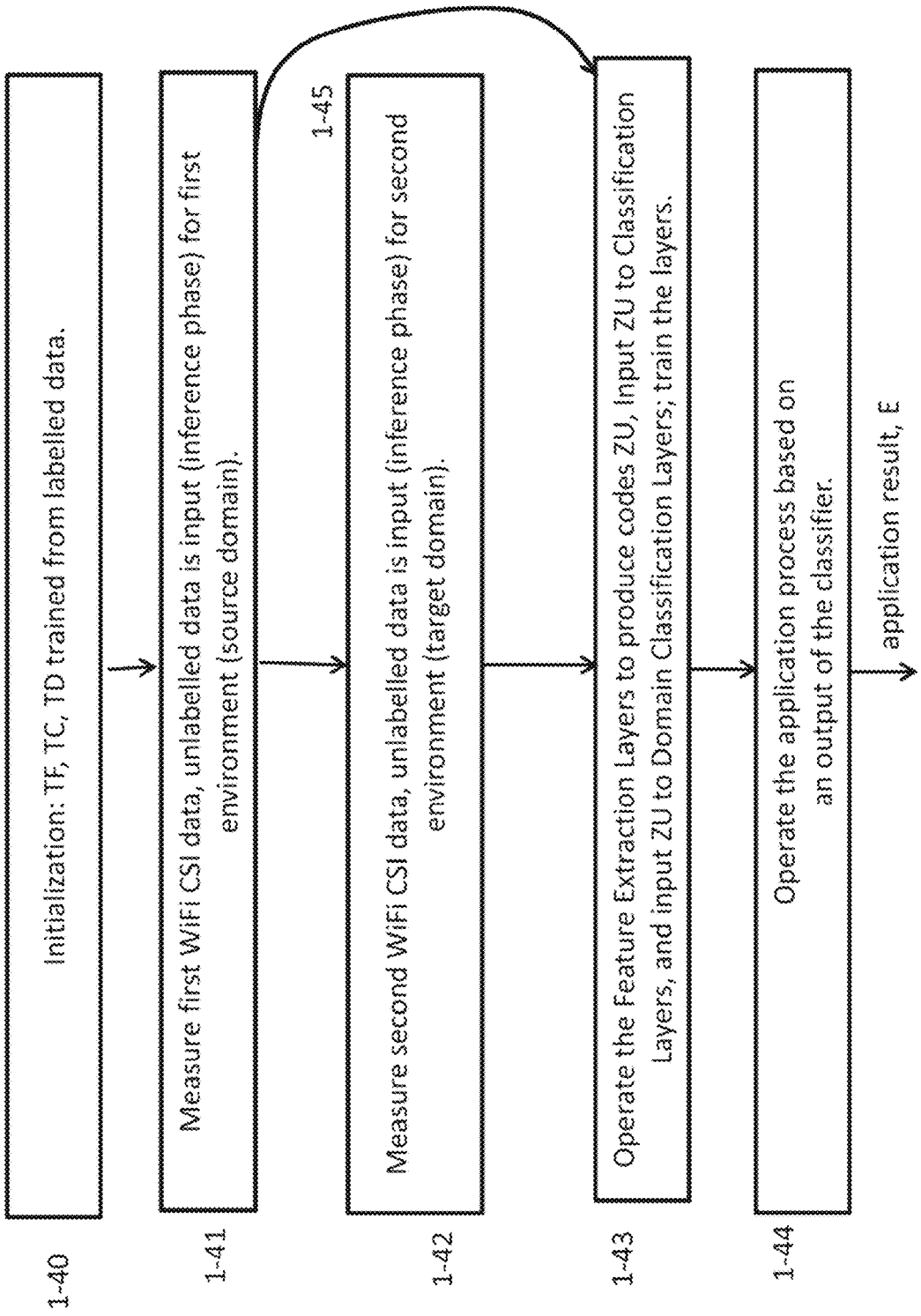
FIG. 1D is a logic flow of the classification system of FIG. 1A receiving unlabeled data for source and/or target domains, according to embodiments.

FIG. 1D illustrates exemplary logic 1-2 associated with FIGS. 1A-1B. At 1-40 the system has already been trained based on labelled data. At 1-41 first CSI data with no location label of a person is input. This data is for the second environment (source domain, for example a room with no change of furniture or no change of orientation of some object from default positions or orientations).

At 1-42 second CSI data with no location label of a person is input. Also a chair, door or window may have been moved or opened or closed. At 1-43 the feature extractor operates and produces codes (ZL for 1-41, ZL for 1-42). The classification layers and domain classification layers operate (this may directly follow 1-41 as shown by arrow).

At 1-44, an application process operates based on a classifier output and produces an application result.

FIG. 1E illustrates an exemplary algorithm for determination of location, motion, heading direction and speed.

The steps of FIG. 1E are as follows:

Step 1. Training phase: collect labelled data XLabelled positions pi (x,y,z geography).

Step 2. Training phase: Observe wifi CSI data, XU, no labels.

Step 3. Apply clustering and probability measures. Reducing entropy of features placed in unlabeled domain.

Step 4. Separate clusters, nearest XL indicating what XU corresponds to in x, y, z.

Step 5. Application phase: collect WiFi CSI data X.

Step 6. Apply classifier to X (estimate location in environment).

Step 7. Repeat Steps 5-6 several times over a few seconds.

Step 8. Estimate location, motion, heading direction and speed based on the geographic locations produced at Step 7. For example, a speed approximation is speed=(r2−r1)/(sample interval), where r2=(x2, y2, z2) and r1=(x1, y1, z1) correspond to two location estimates and sample interval is the time between first and second collections of data at Step 5. Heading may be indicated as the unit vector in the direction of r2-r1. Motion may be a Boolean value such as 0 if speed is less than 0.1 foot/second otherwise 1.

In Step 9, the results of Step 8 may be displayed on the TV and/or used in an application such as one of FIGS. 7A-7F (see below).

Figure 2:
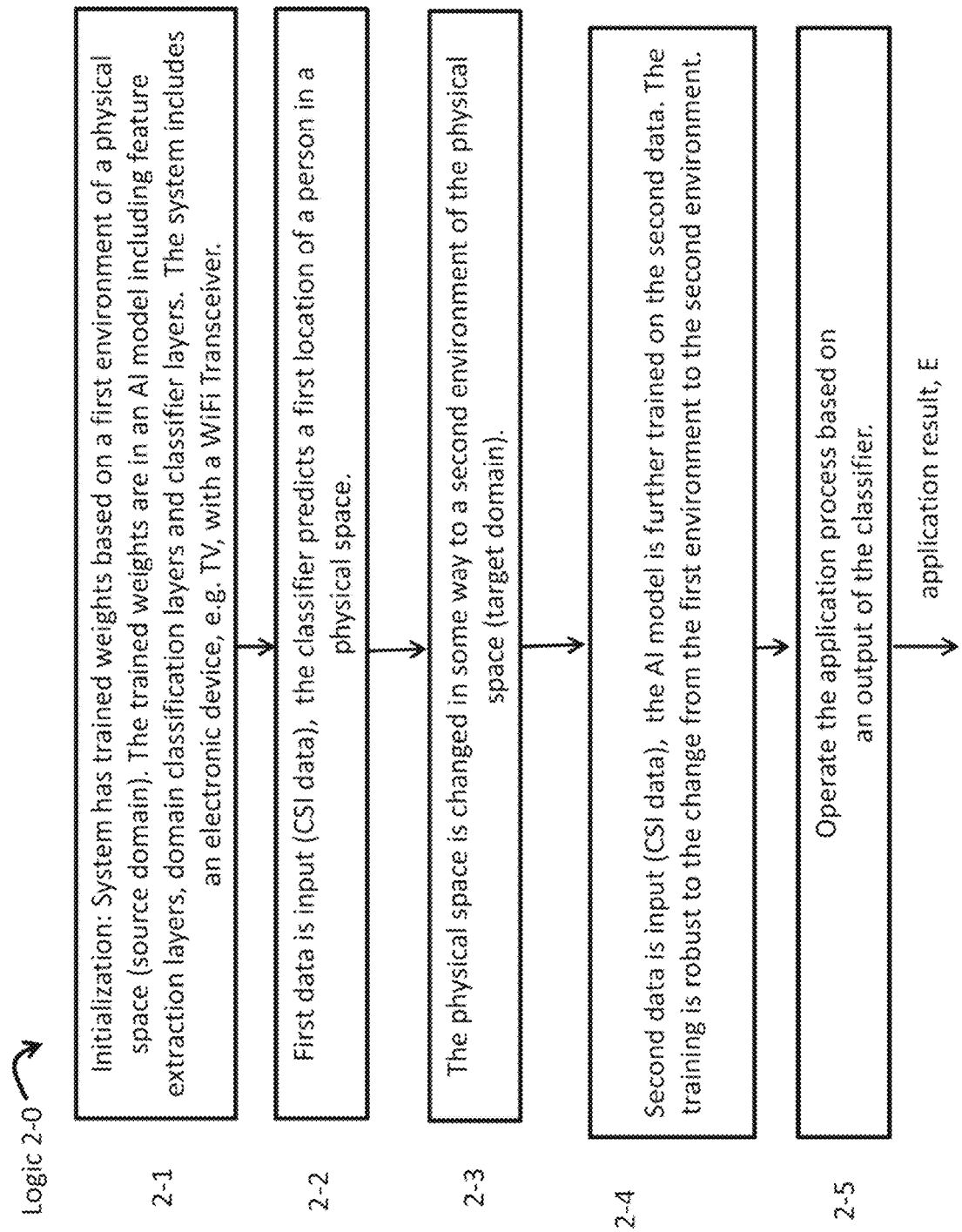
FIG. 2 is a logic flow of the classification system of FIG. 1A processing first and second CSI data when a physical environment changes, according to embodiments.
Figure 6A:
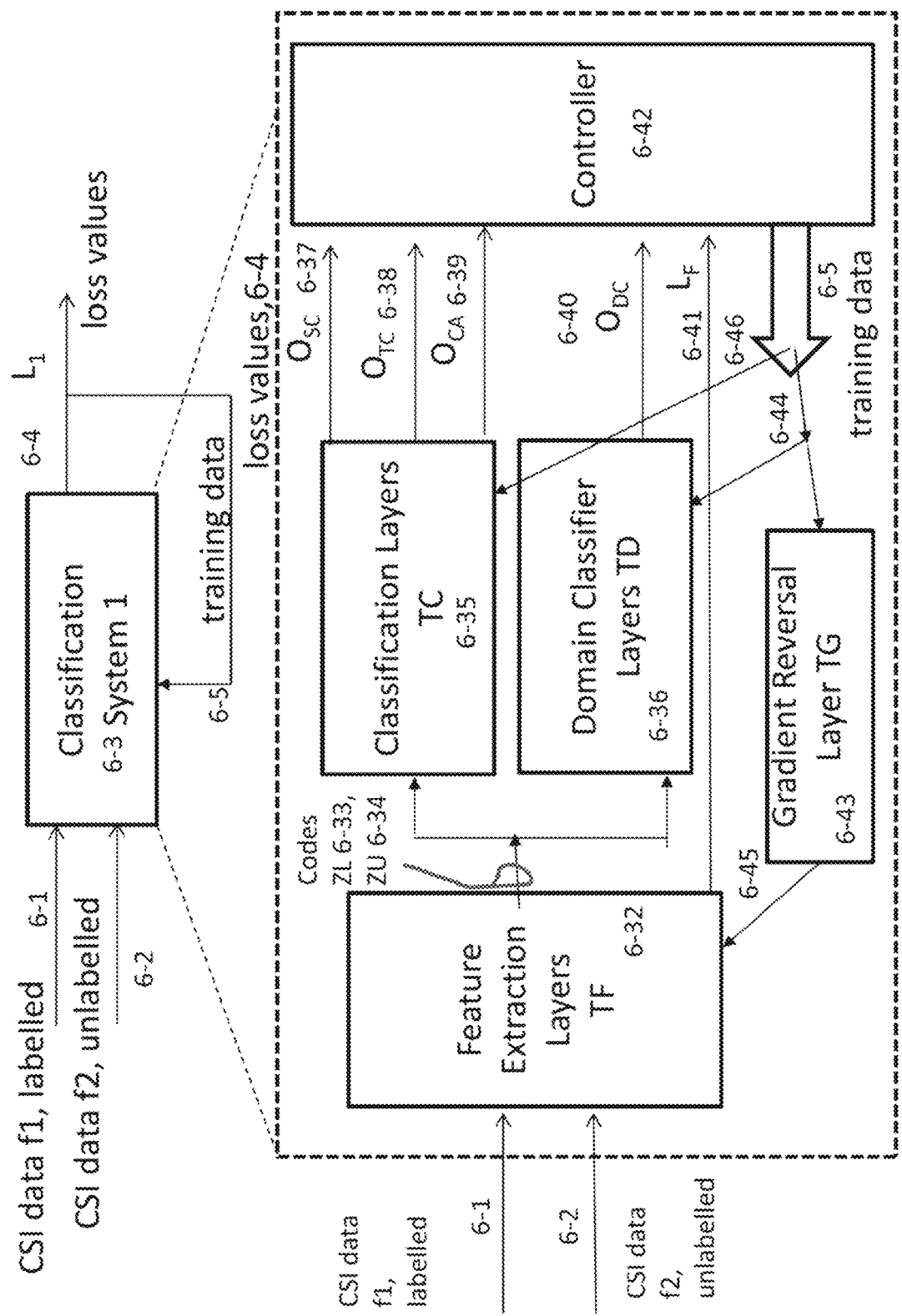
FIG. 6A is a block diagram illustrating a zoom-in representation of the classification system of FIG. 1A. Loss values from each of feature extraction layers, domain classification layers, and classification layers are illustrated, according to embodiments. Also a gradient reversal layer is illustrated.
Figure 6B:
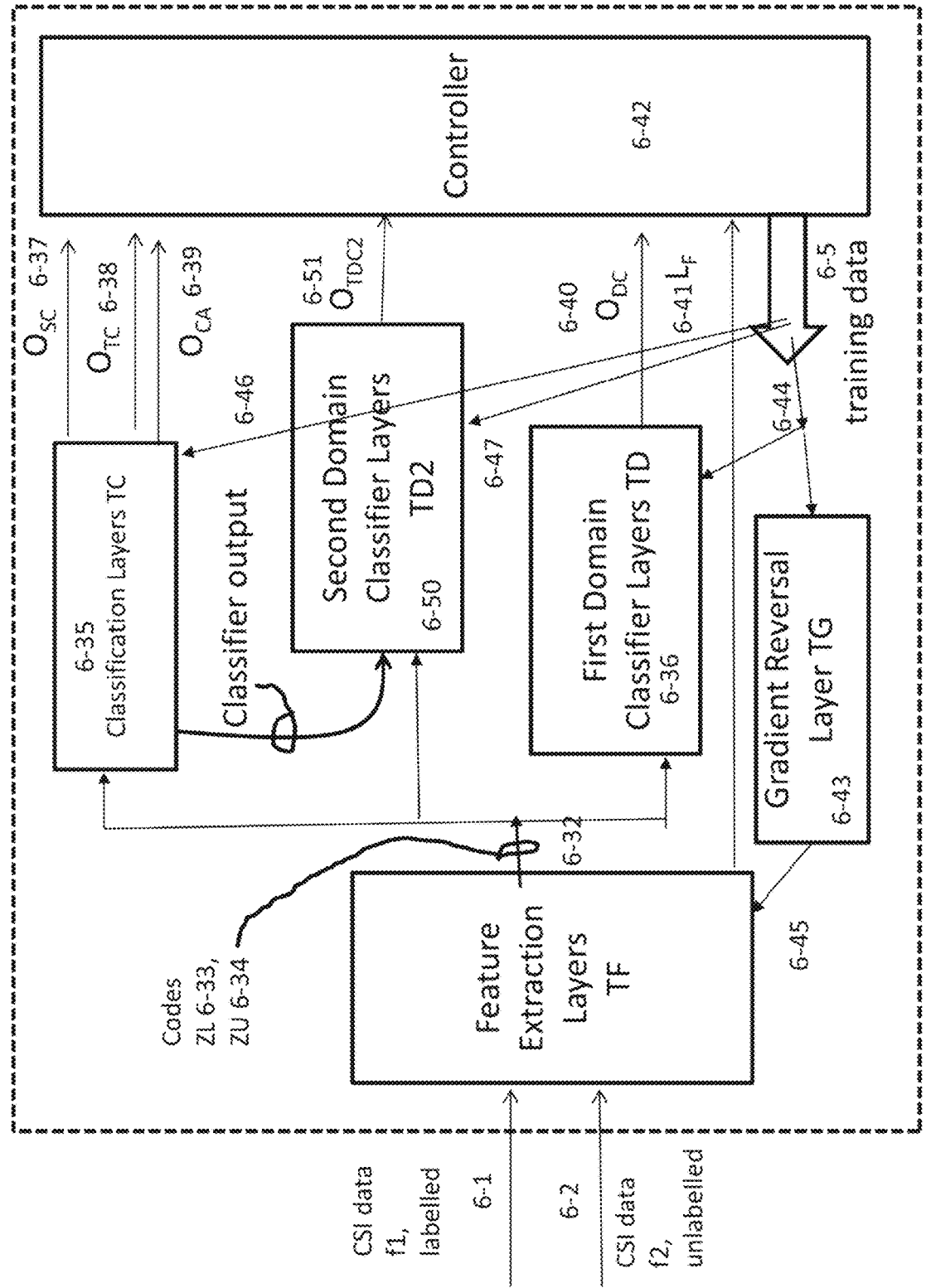
FIG. 6B is a block diagram illustrating a zoom-in representation of the classification system of FIG. 1A. Loss values from each of feature extraction layers, domain classification layers, and classification layers are illustrated, according to embodiments. A gradient reversal layer is illustrated and also second domain classifier layers, according to embodiments.

FIG. 2 illustrates exemplary logic 2-0 associated with FIGS. 1A-1B. At 2-1, the system has trained weights (see FIGS. 1C, 1D and 6A and 6B, for example). At 2-2 first data is input as CSI data. This CSI data may come from one or more WiFi access points (APs) that are networked with the system of FIG. 1A. Exemplary layers of an AI model are shown in FIGS. 6A and 6B and described below. At 2-3, the physical space is changed in some way, for example by movement of a chair, opening a door or closing a window, or a person has entered the physical space. Generally, feature data is referred to with the label "Z" (ZL for labelled and ZU for unlabelled). At 2-4, second CSI data is collected and the AI model is further trained. The classifier operates and outputs a result to the application process and finally an application result is produced by 2-5.

Additional logic flows are provided herein to describe further details and/or variations of the logic 2-0.

Figure 3:
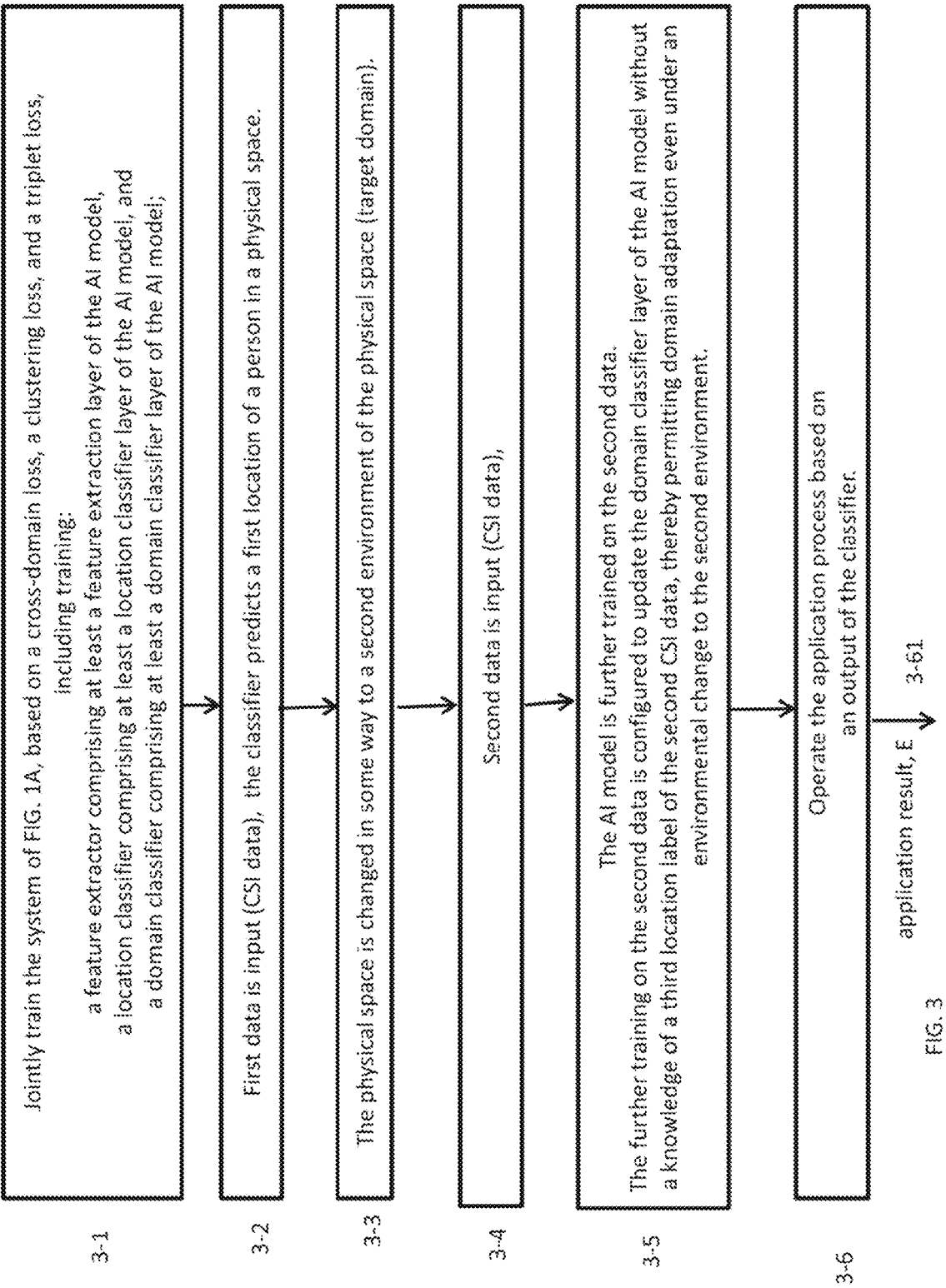
FIG. 3 is a logic flow of the classification system of FIG. 1A receiving first and second data of source and target domains and updating weights of the domain classifier, according to embodiments.

FIG. 3 illustrates exemplary logic 3-0. 3-1, 3-2, 3-3, 3-4 and 3-6 are similar to the corresponding portions of FIG. 2.

At 3-5, the second CSI data is explicitly indicated to not be associated with a label of a person's location in the physical space. The domain classifier is updated without such a label. The ability of the system of FIG. 1-A to consistently extract features Z even though the environment has changed allows adaptation of the domain classifier. The domain classifier is configured to output a result indicating a detection of the environment as the "source domain" or the "target domain."

Figure 4B:
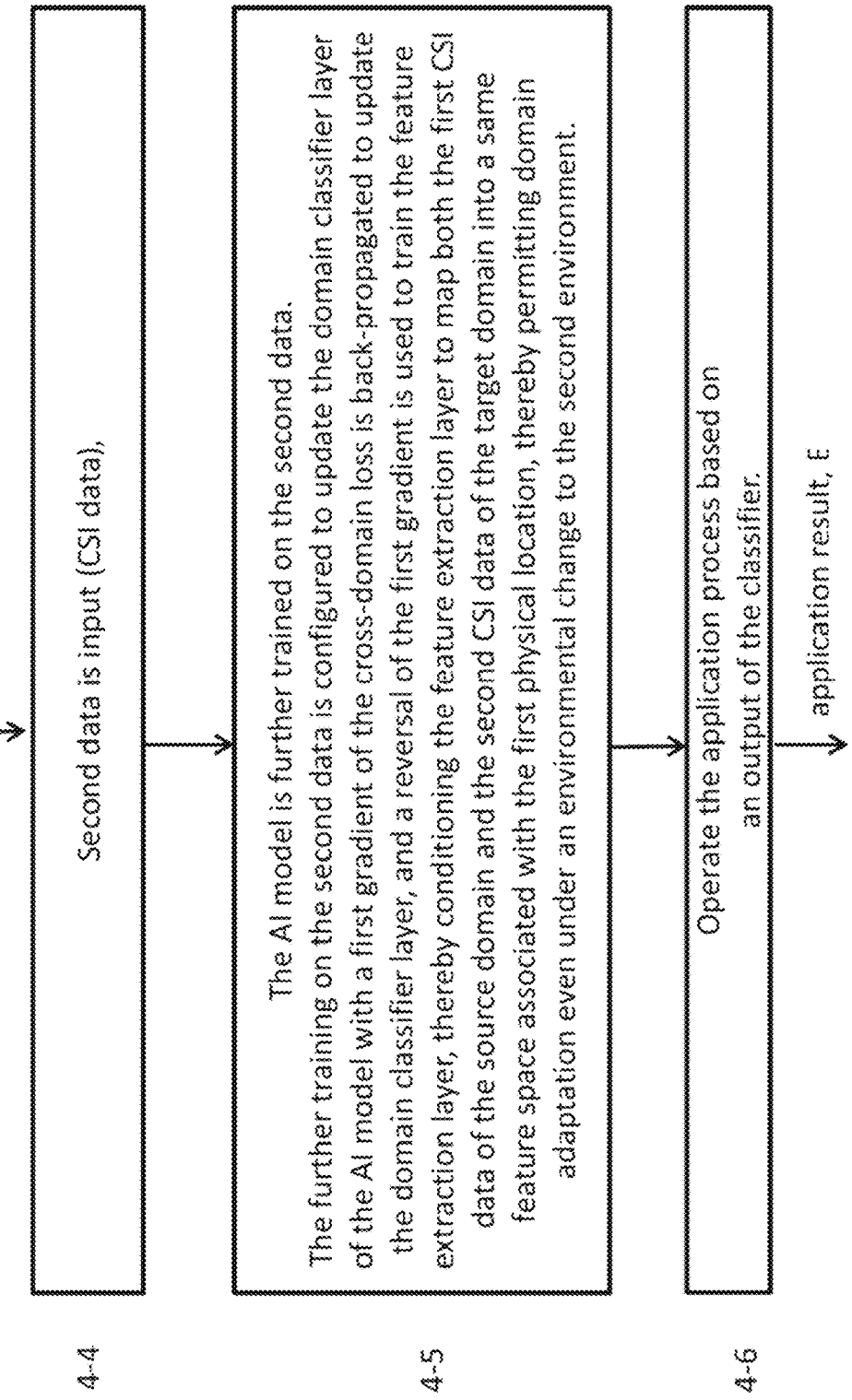

FIGS. 4A and 4B together illustrate exemplary logic 4-0. 4-1, 4-2, 4-3, 4-4 and 4-6 are similar to the corresponding portions of FIG. 2.

At 4-5, a first gradient is used to train the domain classifier and a reverse of that gradient is used to train the feature extractor. The reverse gradient approach tends to cause the feature extractor to output feature data which is similar for both the source and target domains.

The solutions learn two kinds of features, one is related to location, and the other is related to the environment.

The features related to location are the same across different environments. The feature extractor is responsible to extract location features and to ignore the environment features.

Figure 5B:
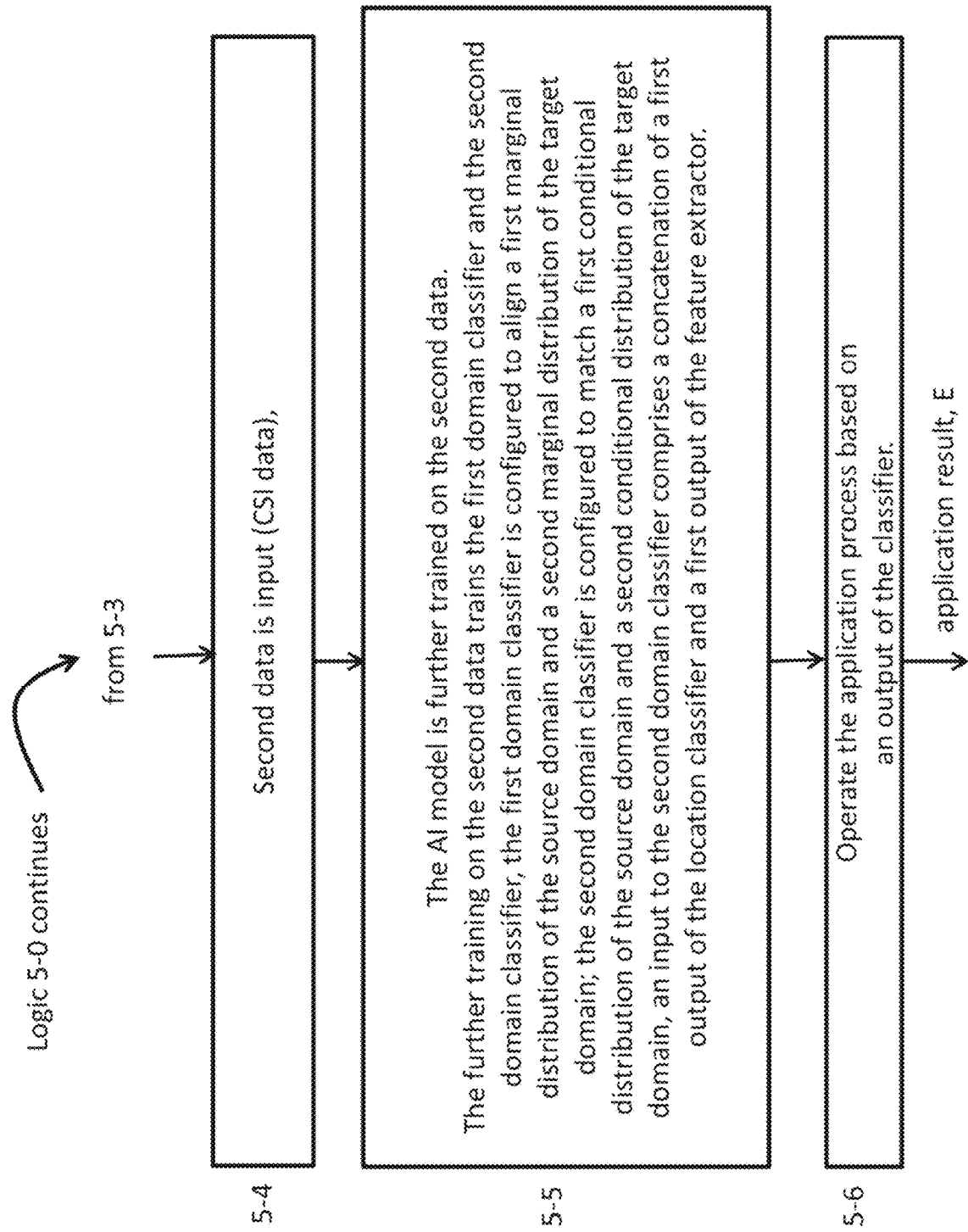

FIGS. 5A and 5B together illustrate exemplary logic 5-0. 5-1, 5-2, 5-3, 5-4 and 5-6 are similar to the corresponding portions of FIG. 2.

At 4-5, both a first domain classifier and a second domain classifier are employed. Also see FIG. 6B below. Training on the first CSI data and/or the second CSI data trains the first domain classifier and the second domain classifier. The first domain classifier is configured to align a first marginal distribution of the source domain and a second marginal distribution of the target domain; the second domain classifier is configured to match a first conditional distribution of the source domain and a second conditional distribution of the target domain. An input to the second domain classifier comprises a concatenation of a first output of the location classifier and a first output of the feature extractor.

FIG. 6A provides further details of training of the classification system 1 (item 6-3 in FIG. 6A). Item 6-3 can be implemented as, for example, a neural network based AI model. A labelled CSI piece of data f1, item 6-1 is input to 6-3. Also, an unlabelled CSI piece of data f2, item 6-2, is input to 6-3. The classification system 1 (item 6-3) processes these and produces loss values L1 (item 6-4) used as training data (item 6-5).

Classification System 1 may be implemented as a neural network based AI model consisting of various neural network layers. For example, the neural network based AI model of Classification System 1 may include feature extraction layers, classification layers and domain classifier layers. Generally and in one example, a neural network may be a computing system made up of a number of interconnected processing elements, which process information by their response to inputs. These processing elements may be organized in layers.

A zoom-in picture is shown in FIG. 6A describing internal functions of the classification system 1. The functions may be realized as software executing on a CPU, as dedicated hardware, as off the shelf software configured according to FIG. 6 or any combination. The zoom-in illustration shows feature extraction layers TF (item 6-32, also referred to as OF) which outputs codes ZL (item 6-33) and ZU (item 6-34). ZL and ZU are input to classification layers TC (item 6-35, also referred to as ΘC) and domain classification layers TD (item 6-36, also referred to as OD). TC outputs loss values OSC 6-37, OTC 6-38 and OCA 6-39; TD outputs loss values ODC (item 6f-40), and TF outputs loss values LF (item 6-41). These loss values are processed individually or jointly by a controller 6-42 to train the layers with training data 6-5. Training data 6-46 is feed to TC, training data 6-44 is fed to TD and to a gradient reversal layer TG item 6-43. TG reverses the gradient and feeds the result 6-45 to TF.

In some embodiments, a second domain classifier can be used. This is shown as item 6-50 in FIG. 6B. FIG. 6B is like FIG. 6A other than item 6-50.

The second domain classifier TD2 item 6-50 receives both features from the TF and a classifier output from TC. TD2 produces a loss measure OTDC2 item 6-51 which is passed to controller 6-42.

A WiFi channel is divided into Ns subcarriers using the Orthogonal Frequency-Division Multiplexing (OFDM) technology. A complex number CSI hi [t] represents the propagation characteristics of the ith subcarrier at time t. If there are NT transmission antennas and NT receiving antennas, then there are in total Nss=NT×NR spatial streams.

Hence, the CSI matrix between the transmitter and the receiver can be denoted as a tensor H[t] G is an element of the space C of dimension NT×Nr×NS.

This tensor is reshaped into a vector, and the CSI magnitude is extracted as x[t] G which is an element of the real space R of length Nss×Ns.

$$x[t]=[|H_{1,1,1}|[t]|,|H_{1,1,2}[t]|, \ldots, |H_{N_T,N_R,N_S}[t]|,$$

Equation 1 (x[t], given above).

where I·I returns the magnitude of a complex number. x[t] is called a CSI data point, which may or may not be associated with a location label y[t].

When setting up the system, a source-domain data set Ds={(xs[t], ys[t])}, t=1, 2, ..., n5, is collected to initiate the system. All CSI data points in this set are denoted as Xs={xs[t]}, t=1, 2, ns. Each source data point xs[t] is associated with a position label ys[t]. After the system is set up, the environment may change. From this changed environment, a target data set, Dt, is collected, which contains only CSI data points, i.e., XT={xT[t]}, t=1, 2, ..., nt. Further, all the CSI data points from these two sets are denoted as X=U XT. The mission of DAFI is to predict the location labels {yT[t]} for XT by learning from Ds and Dr.

Figure 6C:
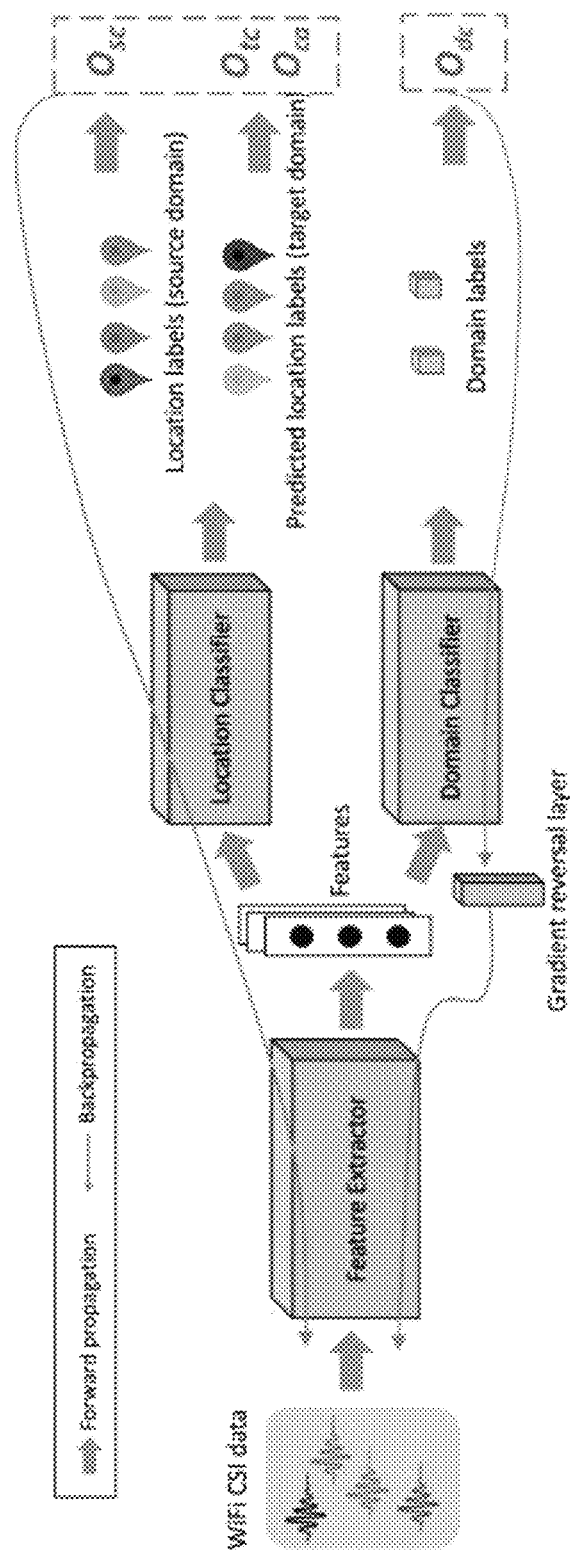
FIG. 6C is a block diagram illustrating a zoom-in representation of the classification system of FIG. 1A. Loss values from each of feature extraction layers, domain classification layers, and classification layers are illustrated, according to embodiments. A gradient reversal layer is illustrated, according to embodiments.

In FIG. 6C, the inputs to DAFI include the source domain fingerprint, i.e., Ds, and the target domain CSI data without labels, i.e., DT. The input CSI data first passes through Feature Extractor module to be mapped to a low-dimension space Z. The features are then passed to a Domain Classifier and a Location Classifier in parallel. The domain classifier is designed to discriminate source-domain data points from target-domain data points. Utilizing the gradient reversal layer, the domain discrimination loss forces the Feature Extractor to produce domain invariant representations. Moreover, the Location Classifier is designed to learn a general classifier by conducting fine-grained domain alignment.

One embodiment includes a Linear Layer-Batch Normalization-Sigmoid activation layer, which is commonly used in Neural Network (NN) based approaches. A shallow feedward NN is employed to extract localization features. The feature extractor F with parameters θf learns a function F which maps x to the reals of dimension m and which maps a data point x (element of the reals Nss×Ns) into a latent representation of m-dimension.

$$zz[t]=F(x[t];\theta_f), x[t] \in X.$$

Equation 2 (z[t], given above).

To implement this module, one embodiment concatenates 3 basic blocks with different dimensions (i.e. 360, 480, and 600).

Based on the extracted features z[t], the location classifier with parameters θf learns a function C: which maps Z into the reals of dimension L and which maps an example into an L dimensional logit vector u(t), where L is the number of position labels, i.e., $$u[t]=C(z[t];\theta_C).$$

Equation 3 (u[t], given above).

Then a "softmax" output layer is used to convert a logit u[t] computed for each class into a probability vector q[t] as $$q[t]=\text{softmax}(u[t]).$$

Equation 4 (q[t], given above).

To implement this location classifier, one embodiment concatenates 2 basic blocks with different dimensions (i.e. 300, and 100). Then, a linear layer that maps 100-dimensional features to L-dimensional outputs is stacked. A well-generalized classifier is learned for both the source domain and target-domain data.

Obtaining domain-invariant features from different domain data is a precondition for learning a well-generalized classifier. One embodiment employs the domain adversarial training technique. The role of the domain classifier is similar to the discriminator in the generative adversarial network. The domain classifier distinguishes latent representations {z[t]} of the source data from those of the target data. Correspondingly, one of the objectives of the feature extractor is to cheat the domain classifier by removing the domain-specific features.

After obtaining extracted features {z[t]}, the domain classifier with parameters θd learns a function D: which maps z onto [0,1] and predicts the domain each data point belonging to, i.e., $$\hat{d}[t]=D(z[t];\theta_d).$$

Equation 4.1 (d hat, given above).

To implement this domain classifier, one embodiment concatenates 2 basic blocks with dimensions 300 and 100, respectively. A linear layer is then added, which maps 100-dimension feature to 2-dimension. During back-propagation, a gradient reversal layer is added before the gradients flow back to the feature extractor.

In order to address the challenge of WiFi localization, DAFI may incorporate loss functions which influence training of neural network weights (AI layers) in different ways.

Source Classification (SC) Loss

Considering that only data Ds is present with labels in the source domain, the location classifier minimizes the following loss, $$O_{sc}(\theta_f, \theta_c) = \left(\frac{1}{n_s}\right) \sum_{t=1}^{n_s} L_{sc}(C(F(x[t]; \theta_f); \theta_c), y[t])$$

Equation 5 (Osc given above).

where Lsc is a cross-entropy function.

The cross entropy of the distribution q relative to a distribution p over a given set is defined as follows:

$$H(p, q) = -\sum_{x \in X} p(x) \log q(x)$$

The domain classifier aims to discriminate the source-domain latent features from its target-domain counterparts, via minimizing the following Domain Classification (DC) loss, $$O_{dc}(\theta_f, \theta_d) = \left(\frac{1}{n_s}\right) \sum_{t=1}^{n_s} L_{dc}(D(F(x[t]; \theta_f); \theta_d), d[t]) + \left(\frac{1}{n_t}\right) \sum_{t=n_s+1}^{n_s+n_t} L_{dc}(D(F(x[t]; \theta_f); \theta_d), d[t])$$

Equation 6 ($O_{ds}$, given above).

where the domain label d[t]=1, if x[t] is in the source domain Ds. Otherwise, d[t]=0. Ldc is the binary cross entropy function.

Figure 6D:
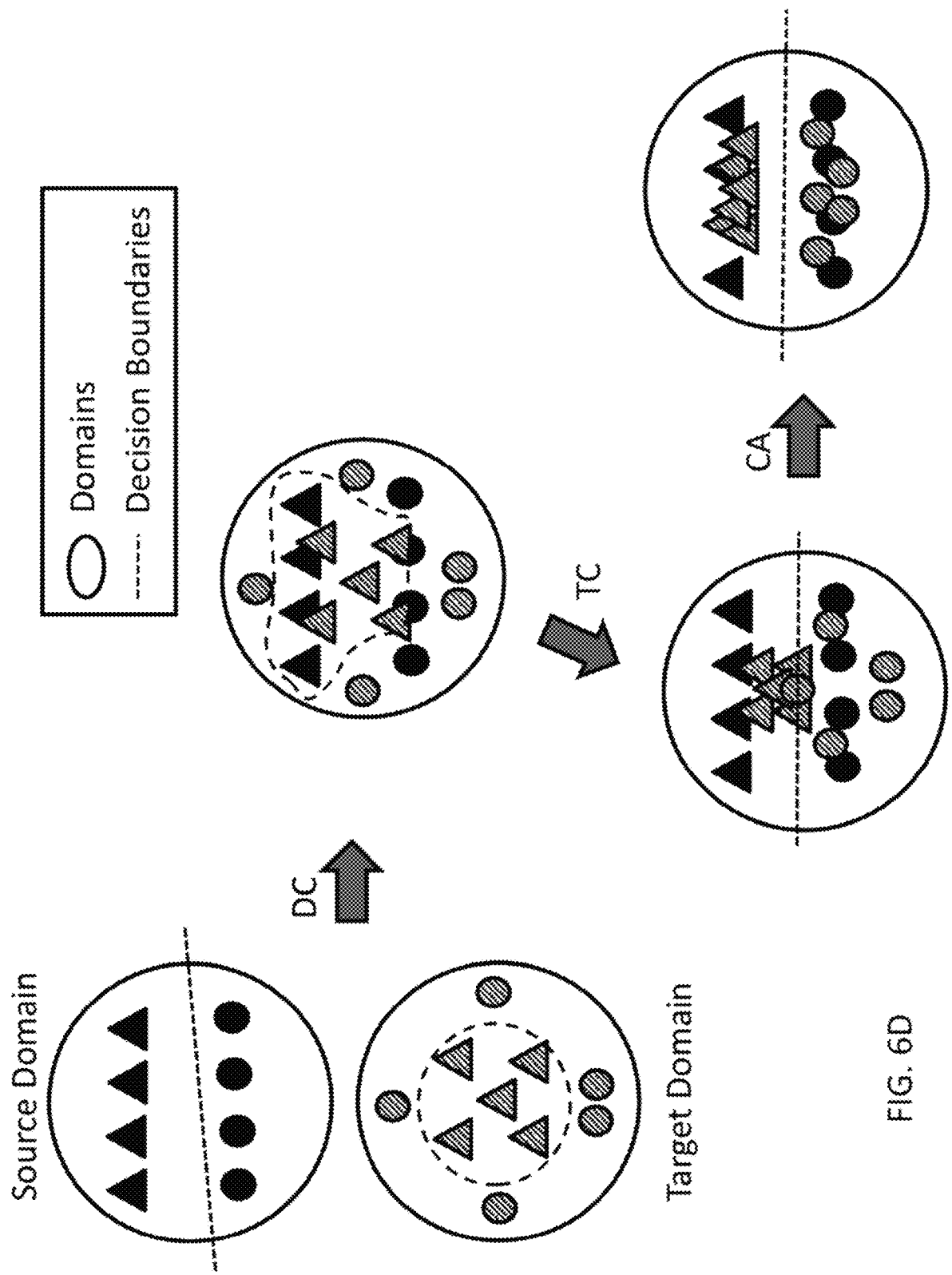
FIG. 6D is a visualization of classifier events, according to some embodiments.

In FIG. 6D, triangles and circles represent location data from two different classes, respectively. Domain Classification (DC) loss is used for mapping data to the same latent space, but may end up with poorly scattered target-domain data points. Target Classification (TC) loss forces these target data to be more concentrated with others from the same class. Class Alignment (CA) loss further pushes each target-domain class towards its source-domain counterpart (lower right portion of FIG. 6D).

When the gradients of this DC loss is back-propagated, it will first update the layers of the Domain Classifier to enhance the domain discrimination accuracy. After that, the gradients will be reversed and back-propagated through the layers of the Feature Extractor. In this way, as illustrated in FIG. 6D, the feature extractor is forced to map both the source-domain and target domain data into the same latent space, and thus produces features covering both domains.

However, this mapping usually poses no constraint on how the data points will scatter in the latent space, leading to unclear boundaries between different classes. Therefore, one embodiment introduces fine-grained class-level operations.

Target Classification (TC) Loss

The first class-level operation is to add a classification constraint on the target domain location prediction/classification. Based on the cluster assumption, the input distribution contains clusters and the data points in the same cluster belong to the same class. A conditional entropy is adopted as Target Classification (TC) loss as follows.

$$O_{tc} = \left(\frac{1}{n_t}\right)\sum_{t=1}^{n_t} -q[t]^T \log q[t]$$

Equation 7 (giving Ow, as above).

This TC loss tries to push the target data of the same location to concentrate in the latent space, and thus increases prediction confidence (and accuracy) of the target data.

Class Alignment (CA) Loss

Another class-level operation is to introduce a Class Alignment (CA) loss.

To build this CA loss, a triplet loss function is first calculated, i.e., $$L(u_a, u_p, u_n) = \max((\|u_a - u_p\|_2 - \|u_a - u_n\|_2 + \alpha, 0)$$

Equation 8 (giving the triplet loss function L, as above).

where $u_a$ is a feature representation of anchor data, $u_p$ is a positive point with the same label as anchor and un is the negative point, α is a margin between positive and negative pairs.

A pseudo-label, y[t]=argmax over i of qi[t], is assigned to each target data x[t]. Then for each location $p_i$ (indexed by i), first the corresponding source data is taken as the anchors; second their target domain counterparts are considered with y[t]=$p_i$ as positive points; and third, the other target domain data is treated as negative points.

Then the CA loss is defined as a sum of the triplet losses, i.e., $$O_{ca} = \left(\frac{1}{L*N_p}\right)\sum_{i=1}^{L} \sum_{u_a \sim U_S^i, u_p \sim U_T^i, u_n \sim \{U_T | U_T^i\}} L(u_a, u_p, u_n)$$

Equation 9 (giving $O_{ca}$, as above).

where L is the number of classes and Np is the number of sample data. U sub S sup i is the set of u with label i in the source domain, U sub T sup I is the set of u with pseudo label i in the target domain and U sub T is the set of u in the target domain.

As illustrated in FIG. 6D, by minimizing this CA loss, the target-domain data points are moved closer to their source-domain counterparts inside the latent space (lower right portion of FIG. 6D).

Overall Training Process

The overall loss to be minimized is $$O_{all} = \lambda_{sc} O_{sc} + \lambda_{dc} O_{dc} + \lambda_{tc} O_{tc} + \lambda_{ca} O_{ca}.$$

Equation 10 (showing $O_{all}$, as above).

Where λsc, λdc, λtc and λca are hyper-parameters for balancing each part. As shown in FIG. 6C, a gradient reversal layer is added between domain classifier and feature extractor. Hence, the parameters θf and θc can be learned by using SGD. The parameters θf and θc are the weights of the feature extractor and the classifier, respectively. θc is a vector representing the weights of the location classifier. θd represents the weights of the domain classifier. θd1 and θd2 represent the weights of the domain classifier in an exemplary extended configuration (see FIG. 6F, described below).

FIG. 6E provides example performance versus various benchmarks. Exemplary data for the DANN benchmark is also shown in FIG. 6J. Performance of an embodiment of the present application is marked with an arrow in FIG. 6E.

Embodiment with Two Domain Classifiers

Figure 6F:
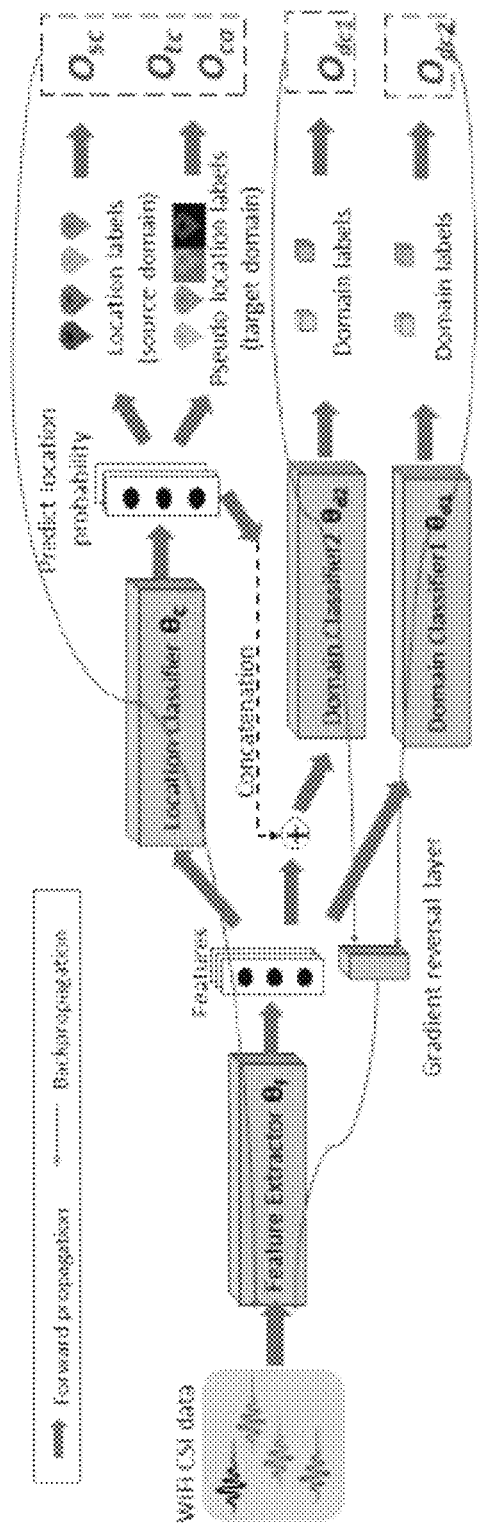
FIG. 6F illustrates an embodiment with two domain classifiers, according to embodiments.

FIG. 6F illustrates an embodiment block diagram with two domain classifiers.

An overview of two-domain-classifier embodiment is shown in FIG. 6F. This embodiment is like the embodiments described above and includes two domain classifiers.

The inputs in FIG. 6F include the source-domain fingerprints, i.e., DS, and the target-domain unlabelled CSI data, i.e., DT. The input CSI data first passes through a Feature Extractor module to generate latent features in a low-dimension space Z. The features are then passed to the Location Classifier, the Domain Classifier1, and the Domain Classifier2.

Different from DANN and its variants, FIG. 6F employs two domain classifiers, which apply loss functions with different focuses to better distinguish CSI domains. Utilizing the gradient reversal layer, these two domain classifiers force the Feature Extractor to produce domain invariant latent features.

The Location Classifier conducts fine-grained domain alignment in addition to the location prediction, so as to further generalize the trained model for both domains.

In the Feature Extractor, some embodiments use a feed-forward NN to extract localization features. The feature extractor with parameters θf learns a function F: mapping a vector x to the m dimensional real space and maps a data point x[t] which is an element of the real space NSS*NS into a latent feature z[t] of m-dimension.

The location classifier with parameters θc learns a function C which maps the latent feature vector z into the real space of dimension L, a logit vector. As used herein "feature vector z" and "latent feature vector z" refer to the same thing.

L is the number of position labels. Then a "softmax" output layer is used to convert a logit u[t] computed for each class into a probability vector q[t]=softmax(u[t]).

Embodiments provide a well-generalized classifier for both the source-domain and target-domain data.

Domain Classifiers. Obtaining domain-invariant features from different domain data is a crucial precondition for learning a well-generalized classifier. Some embodiments employ a domain adversarial training technique. The domain classifiers distinguish latent features {z[t]} of the source data from those of the target data. Correspondingly, one of the objectives of the feature extractor is to cheat these two domain classifiers by removing the domain-specific features.

The domain classifier is only used for distinguishing the source domain from the target domain. For example, the domain classifier tells whether the current environment is the same as 2 seconds before or not, or whether the current user is the owner of the house. The domain classifier is not responsible for localization.

The term "cheat" used here means the feature extractor learns to remove domain-related information, so that the domain classifier cannot accurately distinguish the domains. In this adversarial way, the feature extractor can finally learn domain-independent features.

The role of the Domain Classifier) is aligning the marginal distributions between the source domain and the target domain.

After obtaining extracted features $\{z[t]\}$, the Domain Classifier1 with parameters $\theta d1$ learns a function D1: which maps z to an element of the set [0,1], and thus predicts the domain each data point belonging to, i.e., estimated d1 [t]=D1(z[t]; $\theta d1$):

The purpose of the Domain Classifier2 is to match the conditional distributions. Embodiments use a conditioning method of D2, which concatenate the extracted feature and location classifier prediction or estimate, that is estimated d2[t], =D2((z[t] I q[t]); $\theta d2$), where "I" indicates the concatenation function.

Figure 6G:
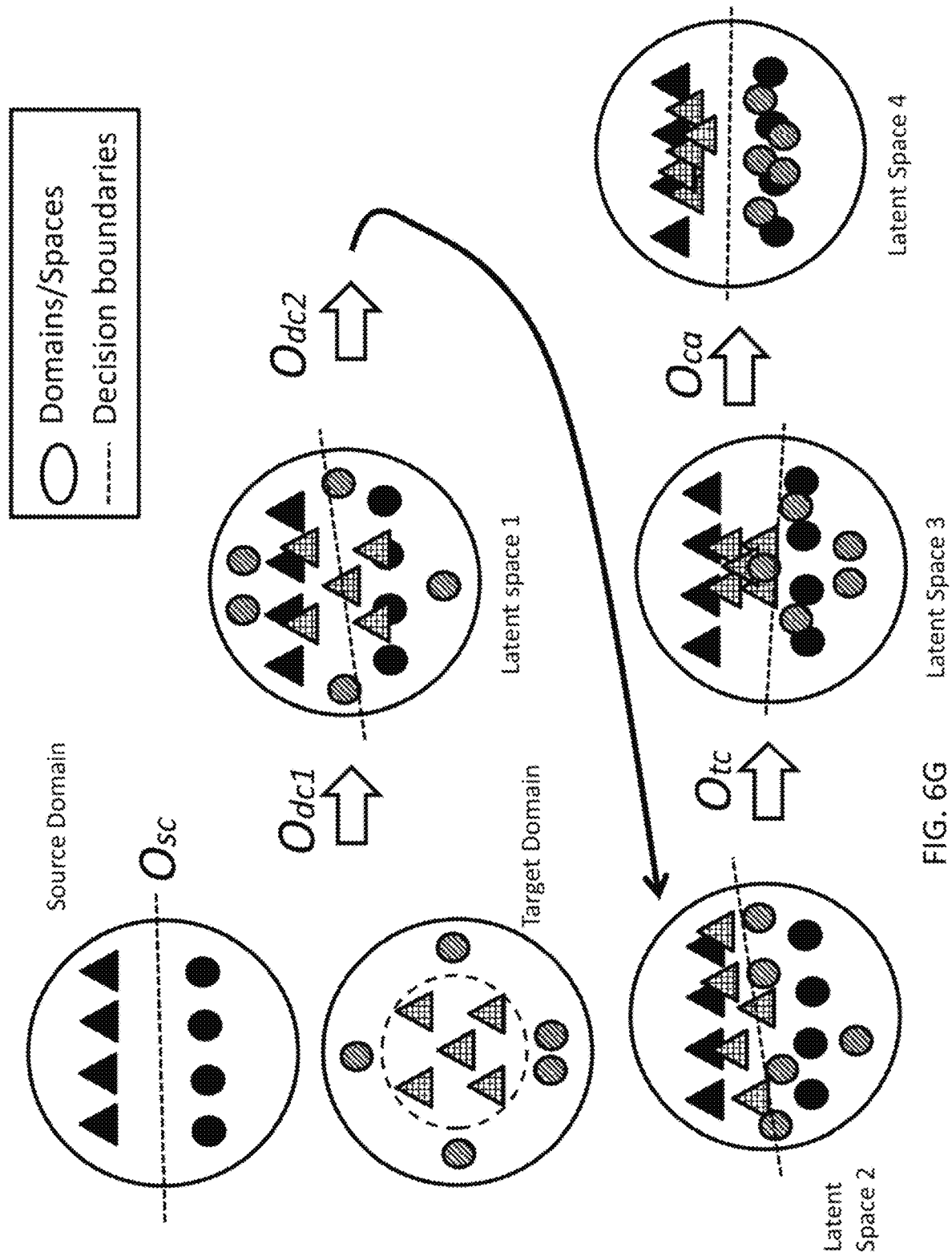
FIG. 6G is a visualization of classifier events, according to some embodiments with two domain classifiers.

Embodiments incorporate multiple loss functions with different focuses in order to benefit applying the domain-adversarial learning method into WiFi-based localization. FIG. 6G provides a summary of these losses and visualizes their operations in the latent spaces.

In FIG. 6G, solid triangles and circles represent location data from two different classes, respectively. Domain Classification (DC) loss aims to map both domains into the same latent space, but may end up with randomly scattered target-domain data point in that space. Target Classification (TC) loss forces these target data points to be more concentrated with others from the same class. Class Alignment (CA) loss further pushes each target-domain class towards its source-domain counterpart.

Considering that we only have data DS with labels in the source domain, the location classifier minimizes the following Source Classification (SC) loss, $$O_{sc}(\theta_f, \theta_c) = \left(\frac{1}{n_s}\right)\sum_{t=1}^{n_s} L_{sc}(q[t], y[t])$$

Equation 2-1 (Osc, as above).

Two domain classifiers aim to discriminate the source-domain latent features from its target-domain counterparts, via minimizing the following Domain Classification (DC) loss, $$O_{dc}(\theta_f, \theta_{d1}, \theta_{d2}) =$$

$$O_{dc1} + O_{dc2} = \left(\frac{1}{n_s + n_t}\right) \sum_{i=1}^{n_s+n_t} L_{dc}(\hat{d}_1[t], d[t]) + L_{dc}(\hat{d}_2[t], d[t])$$

Equation 2-2 (Odc, as above).

Odc1 and Odc2 are the losses for Domain Classifier1 and Domain Classifier2, respectively. d[t]=1 is the domain label.

d[t]=1, if x[t] is an element of the source domain, DS. Otherwise, d[t]=0. Ldc is the binary cross-entropy.

When the gradients of this DC loss are back-propagated, they will first update the layers of both Domain Classifiers to enhance the domain discrimination accuracy. After that, the gradients will be reversed and back-propagated through the layers of the Feature Extractor. In this way, as illustrated in FIG. 6G, the feature extractor is forced to map both the source-domain and target-domain data into the same latent space, and thus produces domain invariant features. However, this mapping usually poses no constraint on how the data points will scatter in the latent space, leading to unclear boundaries between different classes in the target domain. Therefore, we need to introduce several fine-grained class-level operations to better align two domains.

The first class-level operation is to add a classification constraint on the target domain location/prediction/classification. Based on the cluster assumption, the input distribution contains clusters and the data points in the same cluster belong to the same class. A conditional entropy as Target Classification (TC) loss as follows.

$$O_{tc} = \sum_{t=1}^{n_t} -q[t]^T \log q[t]$$

Equation 2-3 (Otc, as above).

This TC loss tries to push the target data of the same location label to concentrate in the latent space, and thus increases prediction confidence (and accuracy) of the target data.

Another class-level operation is to introduce a Class Alignment (CA) loss.

To build this CA loss, we first calculate a triplet loss function, i.e., $$L(u_a, u_p, u_n) = \max(\|u_a - u_p\|_2 - \|u_a - u_n\|_2 + \alpha, 0)$$

Equation 2-4 (triplet loss L, as above)

where $u_a$ is a feature of anchor data, up is a positive point with the same label as anchor and un is the negative point. a is a margin between positive and negative pairs. Concretely, we first assign a pseudo-label estimated y[t]=argmax iqi[t] to each target data x[t]. Then for each location pi, we 1) take the corresponding source data as the anchors; 2) consider their target-domain counterparts with estimated y[t]=pi as positive points; and 3) treat the other target-domain data as negative points. Then the CA loss is defined as a sum of the triplet losses, i.e., $$O_{ca} = \left(\frac{1}{L * N_p}\right) \sum_{i=1}^{L} \sum_{\prod_i} L(u_a, u_p, u_n),$$

$$\prod_i = \{u_a \sim U_S^i, u_p \sim U_T^i, u_n \sim \{U_T | U_T^i\}$$

Equation 2-5 (class alignment loss Oca, as above).
The overall loss to be minimized is $$O_{all} = \lambda_{sc} O_{sc} + \lambda_{dc} O_{dc} + \lambda_{tc} O_{tc} + \lambda_{ca} O_{ca}$$

Equation 2-6 (overall loss Oall, as above).

Hardware Settings

Figure 13:
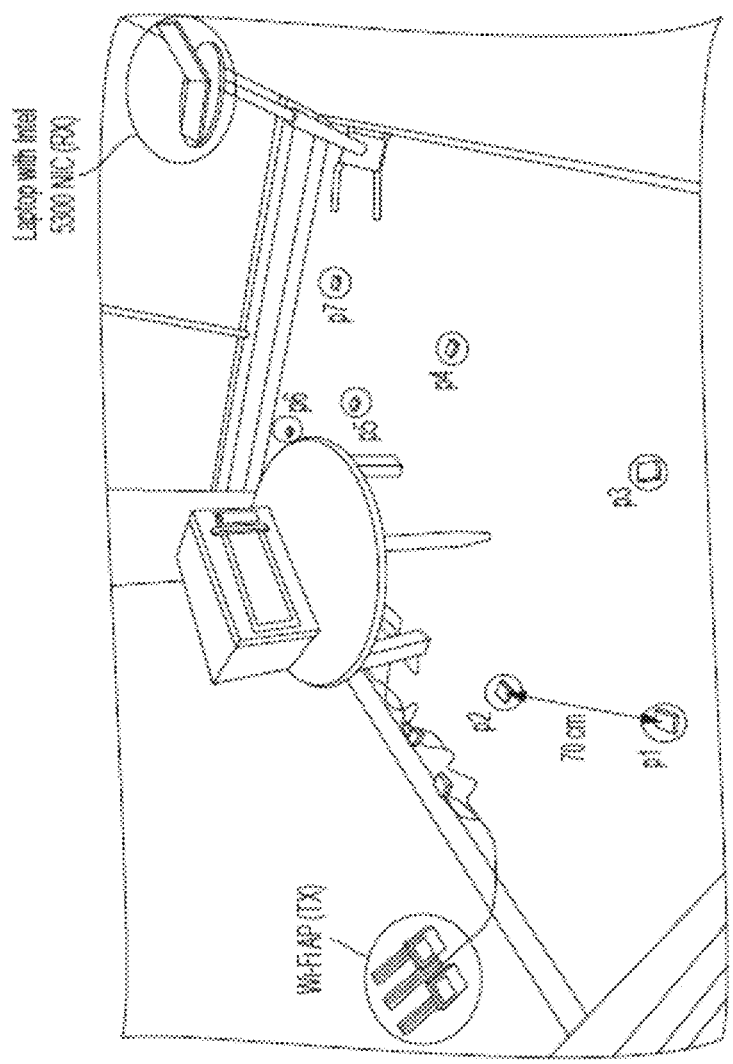
FIG. 13 illustrates an exemplary environment in which embodiments have been evaluated.

Real-life experiments were conducted in a 3 m by 4 m (3 meter by 4 meter) office room. See FIG. 13 for a perspective sketch of the room with locations marked (p1, . . . p8). That is, 8 locations are denoted as p0, p1, . . . , p8 for evaluation, where p0 represents the status of an empty room. The minimum distance between two adjacent locations is roughly 0:7 meters. A Dell Latitude E7440 laptop with a Intel 5300 WiFi chip and a CSI collection tool [30] is connected to a TP-Link AC1750 WiFi router. The transmission rate is set to 100 packets per second. We use 1 transmission antenna 229 (NT=1), and 3 receiving antennas (NR=3), and collect CSI on 30 subcarriers (NS=30).

TABLE 1

Different environments.

| Index | Glass Door | Rolling Chair | Metal Shutters |
|-------|------------|---------------|----------------|
| s1 | Closed | Inside | Closed |
| s2 | Opened | Inside | Closed |
| s3 | Opened | Outside | Closed |
| s4 | Opened | Outside | Opened |

Volunteers worked as the subjects to collect CSI data for all locations. During each data collection run, a subject is allowed to move around the center of one location for 30 seconds. The environment changes are caused by opening or closing a glass door and a metal shutter, and moving a rolling chair into or out of the room. This gives us four different CSI domains, which are defined in Table 1 as s1, s2, s3 and s4, respectively. We have roughly 8K CSI readings on each location in every domain and 64K data for each domain in total. For each domain, we separate the data into 30% training data and 70% testing data. In addition, training data from the target domain have no location labels. We also normalize the CSI magnitudes using the L2-norm.

Figure 6H:
FIG. 6H provides a comparison of accuracy of embodiments with two domain classifiers (showing benchmarks), according to embodiments.

Baseline Methods (note FIG. 6H).

RF trains a Random Forest (RF) on the source-domain data, and directly applies this model on the target-domain data.

TCA learns latent features by extracting the common components of source and target domains. Then a location classifier is trained on the latent features of the labelled source data.

AutoFi automatically detects the status of an empty room, and uses it as a reference point for domain-to-domain mapping. A mapping function is estimated by comparing CSI readings on this reference point in different domains, and is used to transfer CSI readings from the target domain to the source domain, so that the trained model can be reused for the transferred target-domain data.

DANN uses a gradient reversal layer to conduct domain adversarial learning.

ADDA uses two feature extractors, which do not share weights, to match the latent features of the target data to the source data.

A performance comparison is given in FIG. 6H. The bottom row, "DAFI," corresponds to the two domain-classifier configuration of FIG. 6F.

Figure 6I:
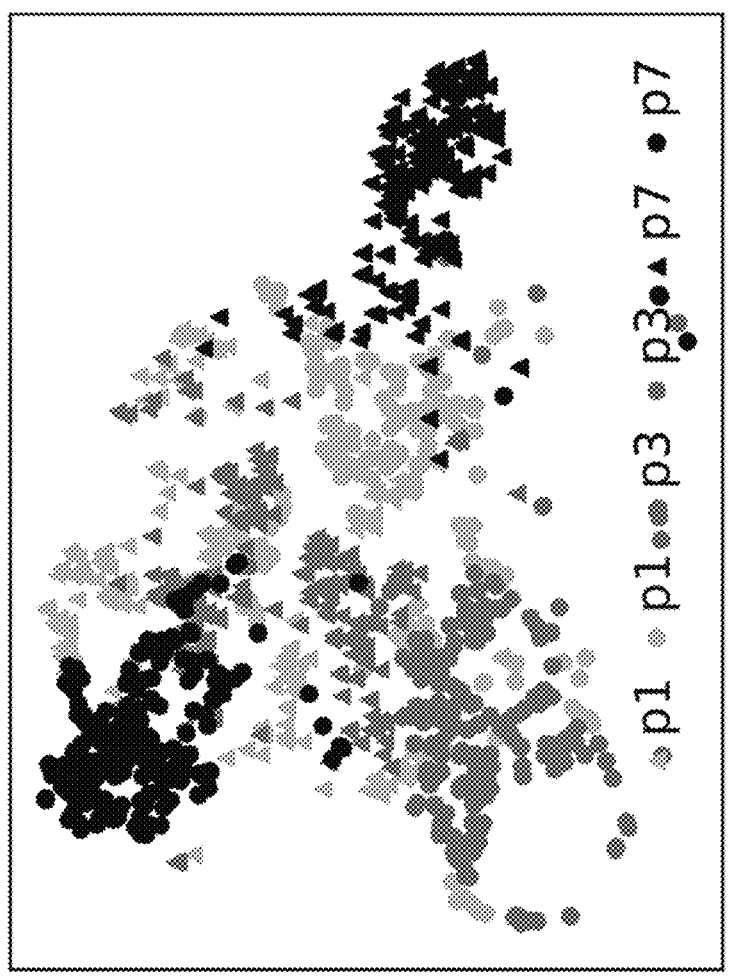
FIG. 6I, FIG. 6J and FIG. 6K illustrate a comparison as a visualization of classifier events, according to some embodiments with two domain classifiers.
Figure 6J:
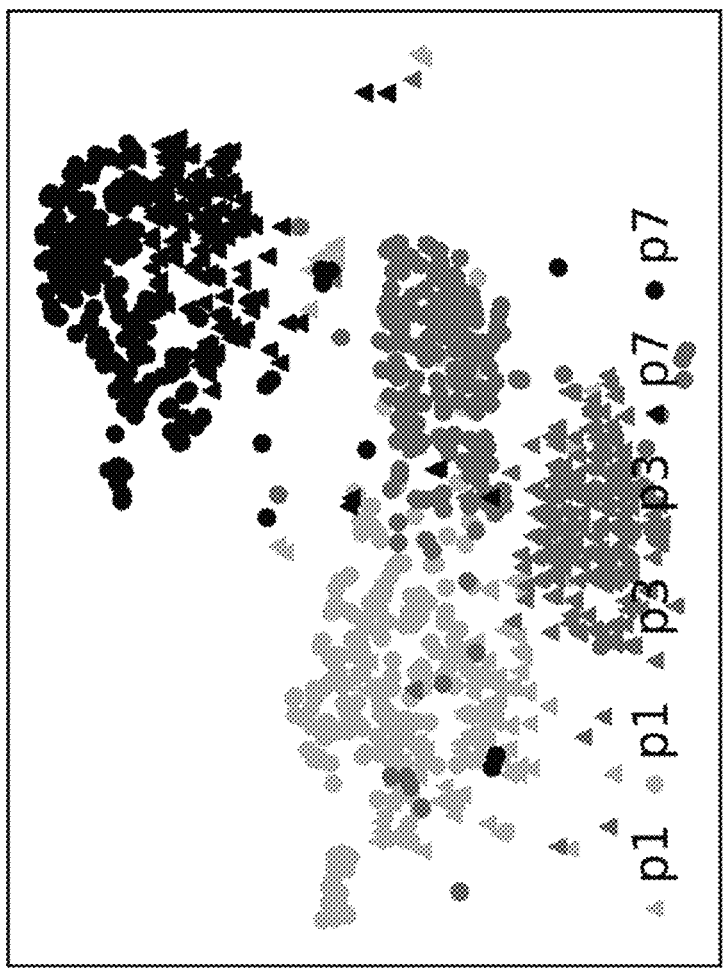

A visualization projected to a 2-d space is given in FIGS. 6I (original data), 6J (DANN benchmark) and 6K (some embodiments, with two domain classifiers).

For example, in FIG. 6I, the legend denotes "p1 p1 p3 p3 p7 p7". In each pair, the first occurrence is for the source domain, the second for the target domain. In FIG. 6I, for a given point, such as p7, the source domain and target domain points are widely separated from each other (p7 triangles clustered to the right, p7 solid dots clustered to the upper left).

For example, in FIG. 6J, for a given point, such as p7, the source domain and target domain points are somewhat clustered near each other (p7 triangles clustered to the upper right, p7 solid dots clustered to the upper right also).

Figure 6K:
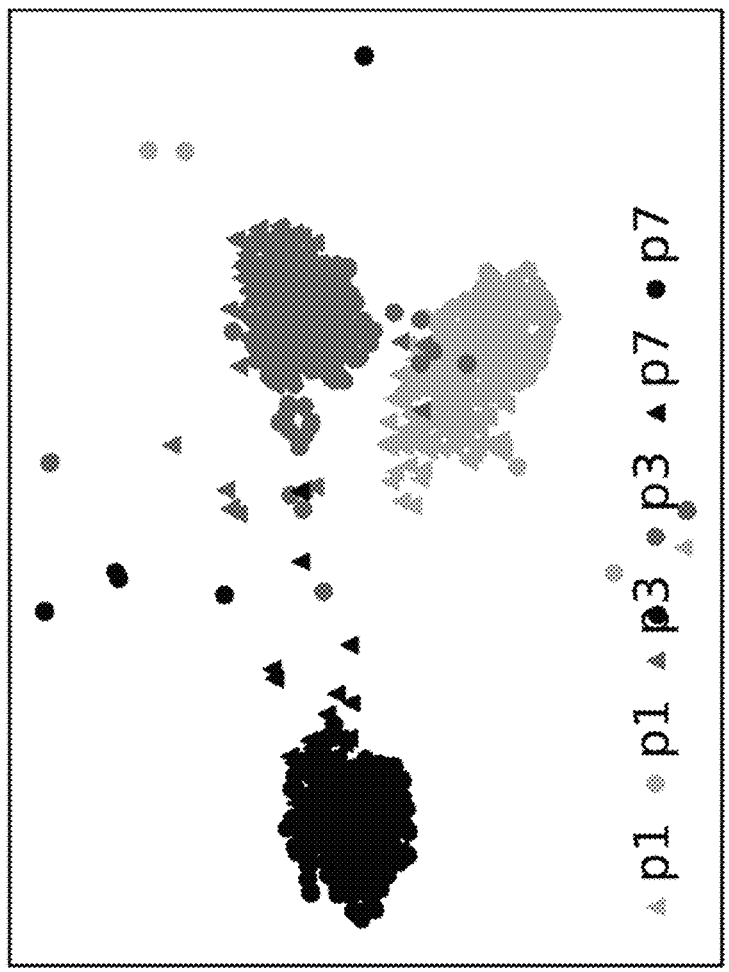

For example, in FIG. 6K, for a given point, such as p7, the source domain and target domain points are strongly clustered near each other (p7 triangles clustered to the middle left, p7 solid dots clustered to the middle left also).

Thus, embodiments address the fingerprint inconsistency of WiFi-based device free localization systems. We formulated this issue as a domain adaptation problem, which treated original environment as the source domain and the changed environment as the target domain. To alleviate users from the burden of labelling new data every time when the home environment changes, we resolved to unsupervised methods. We pointed out the unique challenges of applying classic unsupervised domain adaptation methods to our specific problem, i.e., the difficulty in discriminating two domains in the CSI space. To address this challenges, the proposed solution DAFI went beyond domain-level alignments and conducts class-level operations. Real-world experiments demonstrated that, compared to the state of the art, DAFI improved the localization accuracy by up to 14:2% in the target environment, and at the same time maintained an accuracy of 97:6% in the source environment.

FIGS. 7A, 7B, 7C, 7D, 7E, and 7F illustrate various embodiments of the application system A.

Figure 7A:
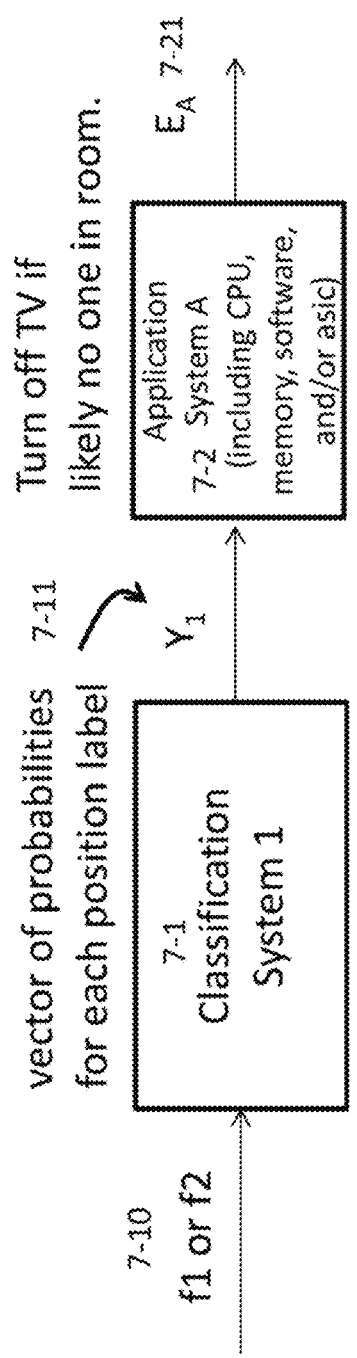
FIG. 7A illustrates the classification system of FIG. 1A and a first example embodiment of the application system of FIG. 1A, according to embodiments.

FIG. 7A illustrates an input CSI data f1 or f2 (item 7-10) input to the classification system 1 (item 7-1). In FIGS. 7B, 7C, 7D, 7E, and 7F the classification system 1 is implied and not shown.

FIG. 7A illustrates an exemplary embodiment in which application system A (item 7-2) produces an output EA (item 7-21). In this example, EA is the event of estimating that no one is present in a room, and turning off a TV.

Figure 7B:
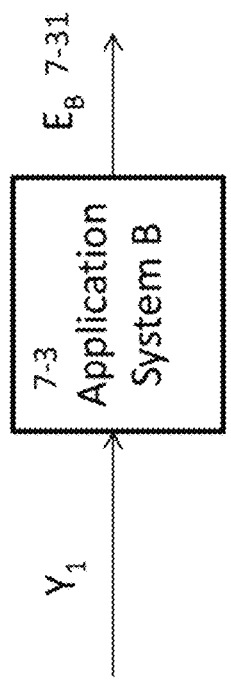
FIG. 7B illustrates the classification system of FIG. 1A and a second example embodiment of the application system of FIG. 1A, according to embodiments.

FIG. 7B illustrates an exemplary embodiment in which application system B (item 12-3) produces an output EB (item 7-31). In this example, EB is the event of estimating a person's location in a room, and beam forming sound from the TV to the location of the person. Beamforming sound means creating a constructive audio pattern of sound waves so that a pleasant sound effect is experienced by a person listening at the location corresponding to the estimated location label.

Figure 7C:
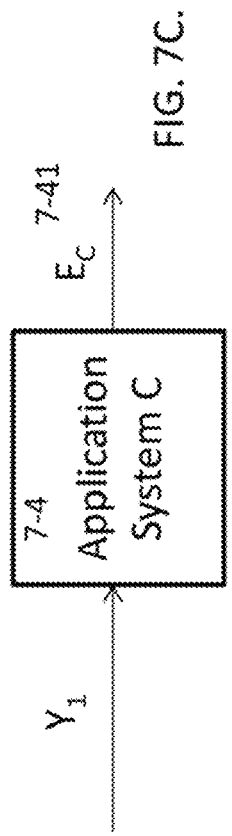
FIG. 7C illustrates the classification system of FIG. 1A and a third example embodiment of the application system of FIG. 1A, according to embodiments.

FIG. 7C illustrates an exemplary embodiment in which application system C (item 7-4) produces an output EC (item 7-41). In this example, EC is the event of estimating a person's location in a room, and pan-tilting a TV toward the location corresponding to the estimated location label. Pan-tiling means rotating the TV screen about a vertical axis and rotating the TV screen about a horizontal axis to direct the screen to the person.

Figure 7D:
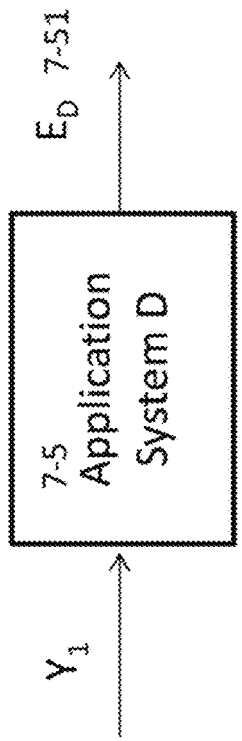
FIG. 7D illustrates the classification system of FIG. 1A and a fourth example embodiment of the application system of FIG. 1A, according to embodiments.

FIG. 7D illustrates an exemplary embodiment in which application system D (item 7-5) produces an output ED (item 7-51). In this example, ED is the event of estimating a person's location in a room, and updating an augmented reality display for a person at the location corresponding to the estimated location label. An augmented reality display provides three dimensional imagery to a person wearing, for example, a special pair of display glasses or a viewer on their head in front of their eyes.

Figure 7E:
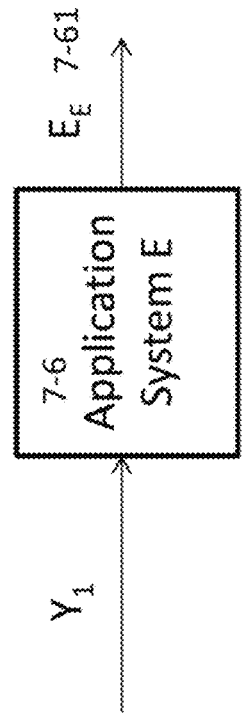
FIG. 7E illustrates the classification system of FIG. 1A and a fifth example embodiment of the application system of FIG. 1A, according to embodiments.

FIG. 7E illustrates an exemplary embodiment in which application system E (item 7-6) produces an output EE (item 7-61). In this example, EE is the event of estimating a person's location in a room, and updating an advertisement for a person at the location corresponding to the estimated location label. In some embodiments, an ad displaying screen is configured by the application system. In some embodiments, the application system controls the displaying screen to be turned be turn on/off automatically based on whether there is someone present in the room or a geographic area of interest within viewing distance of the displaying screen.

Figure 7F:
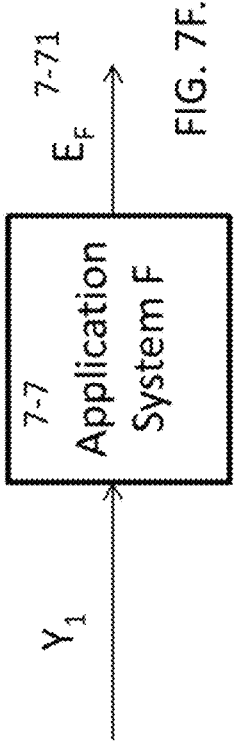
FIG. 7F illustrates the classification system of FIG. 1A and a sixth example embodiment of the application system of FIG. 1A, according to embodiments.

FIG. 7F illustrates an exemplary embodiment in which application system F (item 7-7) produces an output EF (item 7-71). In this example, EF is the event of estimating a person's location in an environment, for example a shop, and performing a financial transaction for the person at the location corresponding to the estimated location label.

Figure 8:
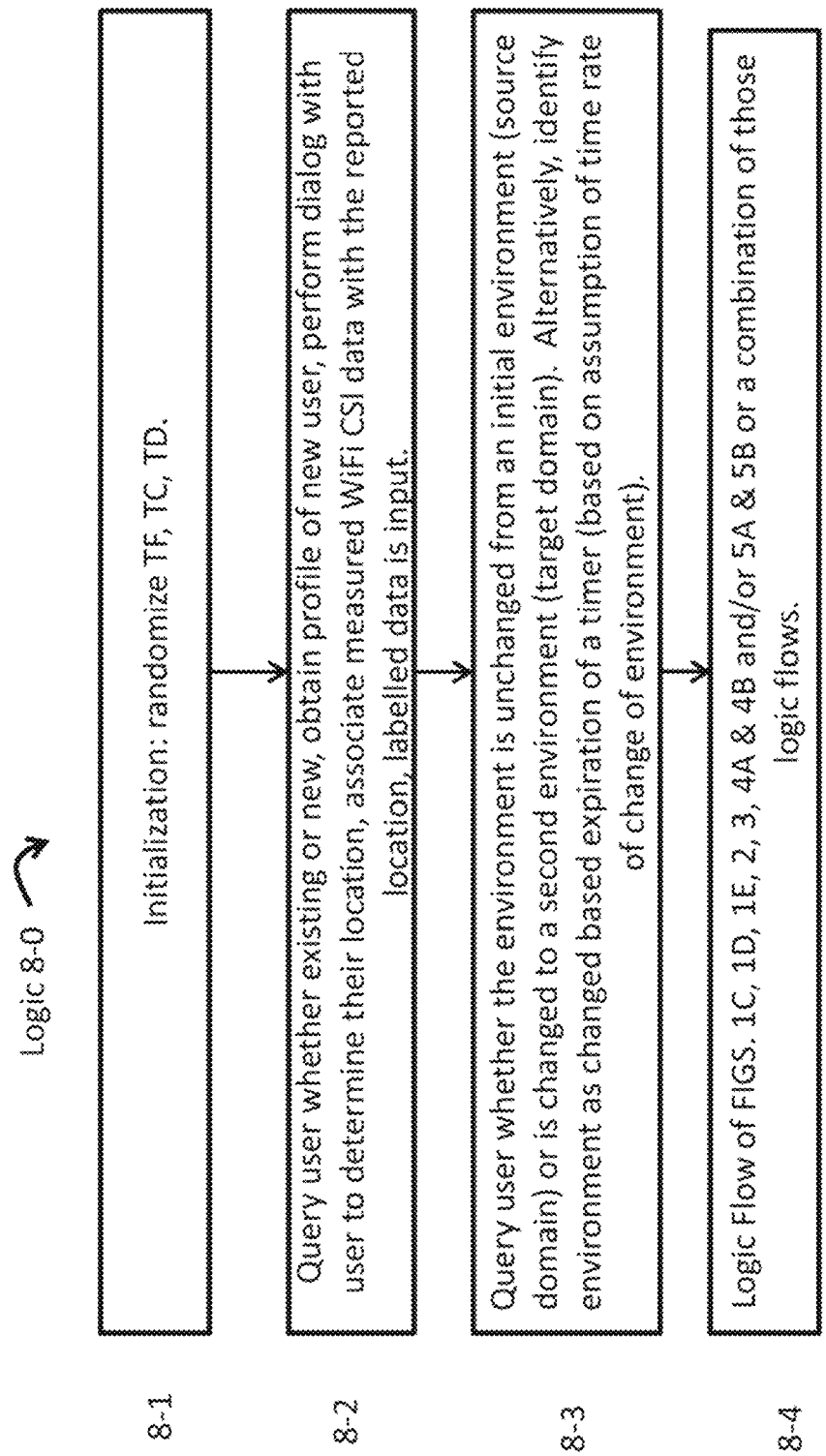
FIG. 8 illustrates an exemplary logic flow of initializing the classification system of FIG. 1A, querying a user, and operating layers using a set of feature data, according to embodiments.

FIG. 8 illustrates exemplary logic 8-0 involving querying a user. At 8-1, the layers TF, TC and TD (and/or TD2) are initialized, for example, by randomization.

At 8-2, a user is queried as to whether they are existing or new, a profile is obtained for a new user and a dialog is performed with the user to determine their location, and associate measured CSI data with the reported location, and labelled data is input. At 8-3, the user is queried to learn if the environment is a source domain or target domain. Alternatively, whether the domain is a source domain or target domain is determined by determining whether a timer corresponding to an assumed rate of change has expired.

At 8-4, subsequent events may take place as in the logic flows of FIGS. 1C, 1D, 1E, 2, 3, 4A & 4B and/or 5A & 5B.

Figure 9:
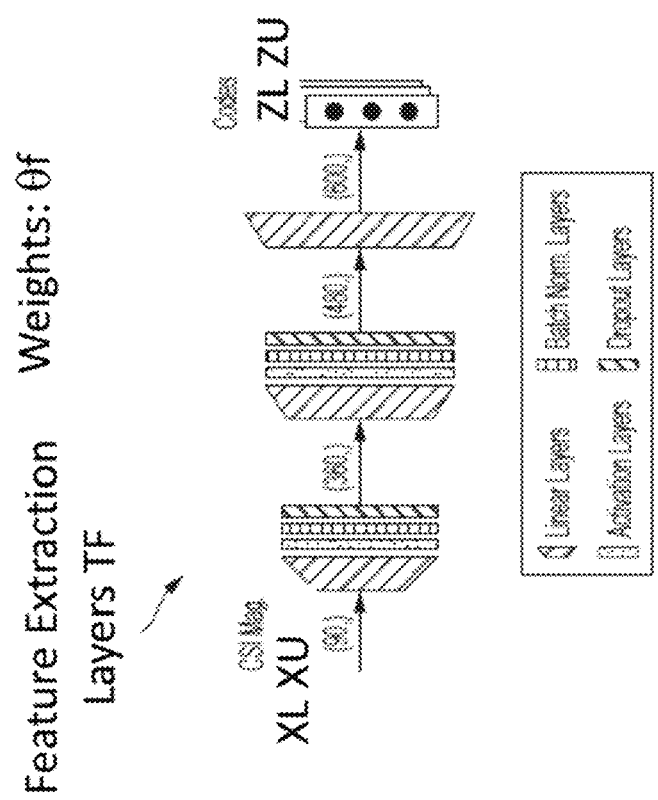
FIG. 9 is a block diagram of exemplary feature extraction layers, according to embodiments.

FIG. 9 provides an exemplary structure of feature extraction layers, TF, for extracting features such as Z.

Figure 10:
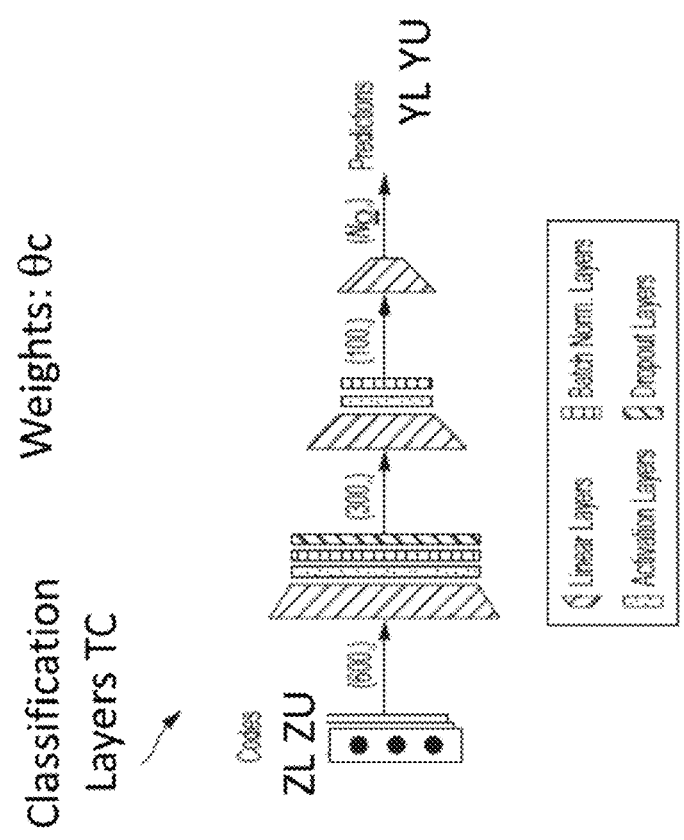
FIG. 10 is a block diagram of exemplary classification layers, according to embodiments.

FIG. 10 provides an exemplary structure of classification layers, TC, for producing probabilities Y1.

Figure 11A:
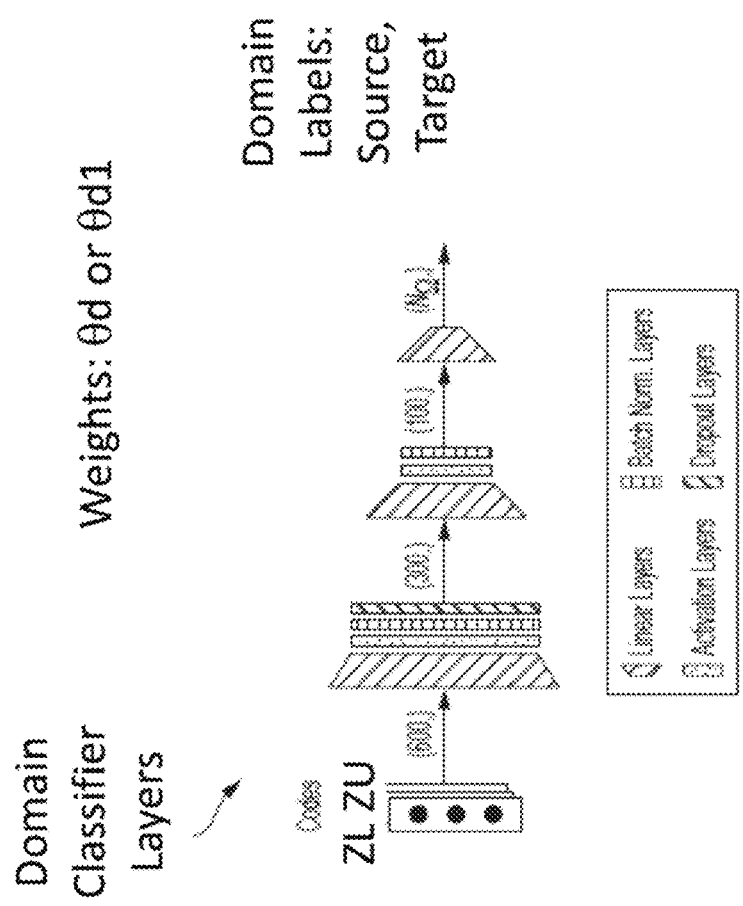
FIG. 11A is a block diagram of exemplary domain classification layers, according to embodiments.

FIG. 11A provides an exemplary structure of domain classifier layers.

Figure 11B:
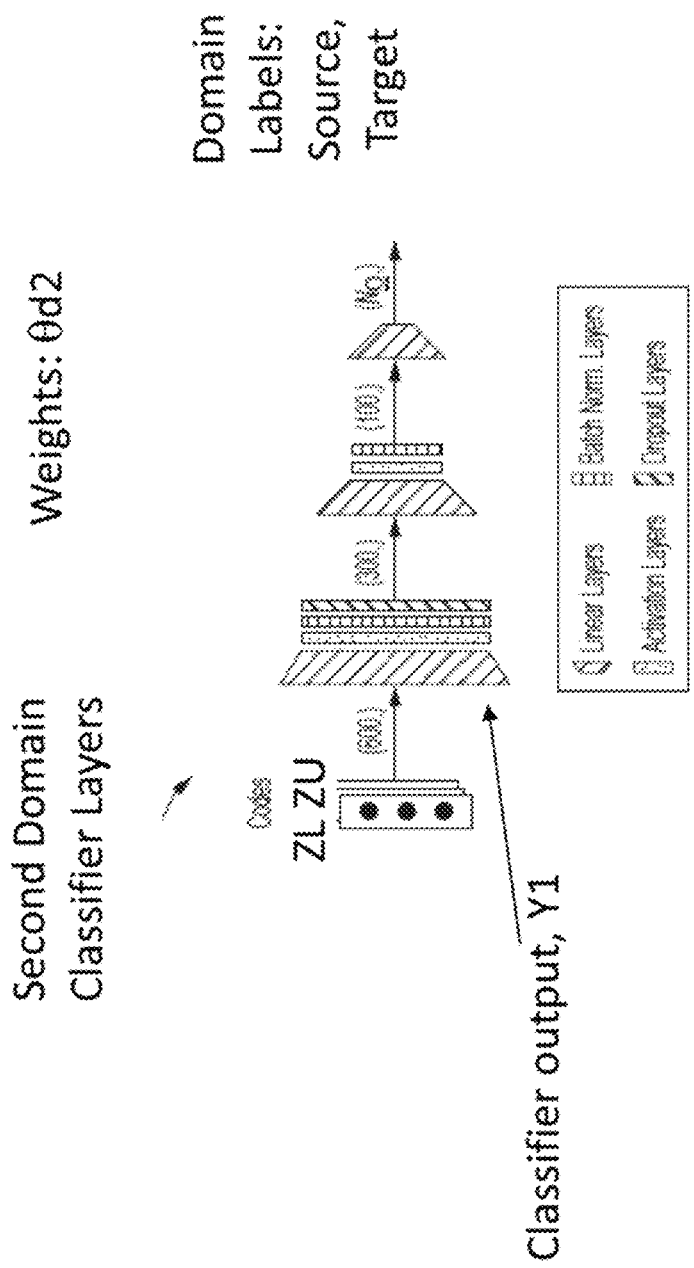
FIG. 11B is a block diagram of exemplary second domain classification layers, according to embodiments.

FIG. 11B provides an exemplary structure of second domain classifier layers, TD2. TD2 includes an input from the classifier, for example, Y1 is an input to the second domain classifier.

Figure 12:
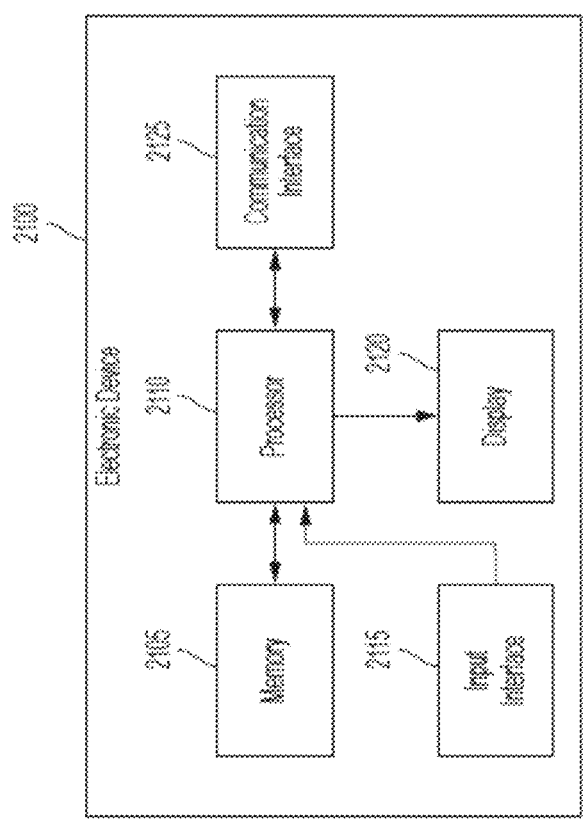
FIG. 12 is a block diagram of an electronic device implementing an apparatus for location-aware applications, according to embodiments.

FIG. 12 is a block diagram of an electronic device 2100 implementing an electronic device for location-aware applications, according to embodiments.

Referring to FIG. 12, the electronic device 2100 includes a memory 2105, a processor 2110, an input interface 2115, a display 2120 and a communication interface 2125. The classification system 1 and/or application system of FIG. 1A may be implemented as the electronic device 2100.

The processor 2110 takes overall control of the electronic device 2100. The processor 2110 executes one or more programs stored in the memory 2105.

The memory 2105 stores various data, programs, or applications for driving and controlling the electronic device 2100. A program stored in the memory 2105 includes one or more instructions. A program (one or more instructions) or an application stored in the memory 2105 may be executed by the processor 2110.

The processor 2110 may perform any one or any combination of operations of the electronic device of FIG. 1A.

The input interface 2115 may receive a user input and/or a data such as a 2D image. The input interface 2115 may include, for example, a touchscreen, a camera, a microphone, a keyboard, a mouse or any combination thereof.

The display 2120 may obtain data from, e.g., the processor 2110, and may display the obtained data. The display 2120 may include, for example, a touchscreen, a television, a computer monitor and the like.

The communication interface 2125 transmits and receives data to and from other electronic devices, and may include one or more components causing communication to be performed via a local area network (LAN), a wide area network (WAN), a value added network (VAN), a mobile radio communication network, a satellite communication network, or a combination thereof.

The block diagram of the electronic device 2100 is provided as an example. Each component in the block diagram may be integrated, added, or omitted depending upon specifications of the electronic device 2100 that is actually implemented. That is, two or more components may be integrated into one component or one component may be divided into two or more components, as needed. In addition, functions performed by the respective blocks are provided for illustrating the embodiments of the disclosure, and operations or devices of the respective blocks do not limit the scope of the disclosure. Additional description is now provided to the further explain the location-aware embodiments described in FIGS. 1-13.

What is claimed is:

1. A method of location determination by a system including an electronic device with a WiFi transceiver and an AI model, the method comprising:
    jointly training, based on a cross-domain loss, a clustering loss, and a triplet loss:
        a feature extractor comprising at least a feature extraction layer of the AI model,
        a location classifier comprising at least a location classifier layer of the AI model, and
        a domain classifier comprising at least a domain classifier layer of the AI model;
    classifying, using the location classifier layer of the AI model and based on a first set of feature data from the feature extraction layer, first channel state information (CSI) data to obtain a first estimated location label of a first person in a first environment;
    receiving, via the WiFi transceiver, second CSI data associated with a second person at a first physical location and a second environment;
    obtaining, using the feature extraction layer of the AI model and based on operating on the second CSI data, a second set of feature data;
    classifying, using the location classifier layer of the AI model and based on the second set of feature data from the feature extraction layer, the second CSI data to obtain a second estimated location label of the second person, and
    outputting, by a visible indication or an audible indication, an indicator of the second estimated location label of the second person.

2. The method of claim 1 further comprising:
    receiving, via the WiFi transceiver, the first channel state information (CSI) data associated with the first person at the first physical location and the first environment; and
    obtaining, using the feature extraction layer of the AI model and based on operating on the first CSI data, the first set of feature data.

3. The method of claim 2, further comprising outputting, by the visible indication or the audible indication, an indicator of the first estimated location label of the first person.

4. The method of claim 2, further comprising:
    back-propagating a first gradient of the cross-domain loss to update the domain classifier layer; and
    back-propagating a reversal of the first gradient to train the feature extraction layer, thereby conditioning the feature extraction layer to map both the first CSI data of a source domain and the second CSI data of a target domain into a same feature space associated with the first physical location.

5. The method of claim 2, wherein the first environment is associated with a source domain, the second environment is associated with a target domain, the cross-domain loss is associated with the source domain and the target domain, the clustering loss is associated with only the target domain, the triplet loss is associated with the source domain and the target domain, the AI model is a neural network based AI model, the second environment is different than the first environment, and the jointly training is configured to update the domain classifier layer of the AI model without a knowledge of a third location label of the second CSI data, thereby permitting domain adaptation even under an environmental change.

6. The method of claim 2, further comprising determining, using a reconstruction layer of the AI model and based on the first set of feature data from the feature extraction layer, a reconstruction loss associated with the first person and the first CSI data.

7. The method of claim 1, wherein jointly training further comprises jointly training based on a location classification loss in a source domain.

8. The method of claim 1, wherein the cross-domain loss is an objective function with a first term and a second term so as to perform adversarial learning, whereby the first term is configured to decrease the cross-domain loss of the domain classifier layer of the AI model and the second term is configured to increase the cross-domain loss of the feature extraction layer of the AI model.

9. The method of claim 1, wherein the clustering loss is an objective function with an entropy term based on only a target domain.

10. The method of claim 1, wherein the triplet loss is an objective function comprising a first term and a second term, the first term being a distance measure in a feature space between source domain anchor points and first target domain points, and the second term being the distance measure in the feature space between the source domain anchor points and second target domain points, thereby tending to align the first target domain points with a first location and tending to align the second target domain points with a second location different than the first location.

11. The method of claim 1, further comprising registering the first person, wherein the registering comprises:
   obtaining, via a user interface of the system, an identifier of the first person,
   obtaining, via the user interface, a ground truth location label of the first person, and
   obtaining, via the WiFi transceiver, third CSI data associated with the ground truth location label; and
   providing an application output based on the first estimated location label or the ground truth location label.

12. The method of claim 1, further comprising training weights of the system, based on third CSI data associated with the first environment and with a second person who is a first registered user of the system, to obtain updated weights.

13. The method of claim 11, wherein the application output comprises the electronic device automatically shutting off based on recognizing that a room associated with the first environment and with the second environment is empty.

14. The method of claim 11, wherein the application output comprises beam-forming, by the electronic device, sound to the first estimated location label of the first person.

15. The method of claim 11, wherein the application output comprises pan-tilting, by the electronic device, a display screen of the electronic device depending on the first estimated location label of the first person.

16. The method of claim 11, wherein the application output comprises updating an augmented reality presentation to the first person based on the first estimated location label of the first person.

17. The method of claim 11, wherein the application output comprises providing an advertisement to a personal electronic device of the first person based on the first estimated location label of the first person.

18. The method of claim 11, wherein the application output comprises a first indication of an estimated location of the first person.

19. The method of claim 18, wherein the application output comprises a second indication of whether the first person is stationary or moving within a predetermined period of time.

20. The method of claim 19, wherein the application output comprises a third indication a direction of motion of the first person within a second predetermined period of time.

21. The method of claim 20, wherein the application output comprises a fourth indication of a speed of motion of the first person within a third predetermined period of time.

22. The method of claim 1, further comprising:
   obtaining, via a user interface of the system, an identifier of the first environment as a source domain or the second environment as a target domain.

23. The method of claim 1, further comprising:
   determining, based on a passage of a predetermined time, that a current environment has changed from a source domain to a target domain.

24. The method of claim 1, further comprising:
   determining, based on a reconstruction loss measure, that a current environment has changed from a source domain to a target domain.

25. The method of claim 1, wherein the domain classifier is configured to align a first marginal distribution of a source domain and a second marginal distribution of a target domain.

26. The method of claim 21, wherein the domain classifier includes another domain classifier, wherein the another domain classifier is configured to match a first conditional distribution of a source domain and a second conditional distribution of a target domain, and a second AI model comprising the another domain classifier is an extended form of the AI model.

27. The method of claim 26, wherein an input to the another domain classifier comprises a concatenation of a first output of the location classifier and a first output of the feature extractor.

28. An electronic device comprising:
   one or more memories, wherein the one or more memories comprise instructions;
   a WiFi transceiver; and
   one or more processors, wherein the one or more processors are configured to execute the instructions to:
      jointly train, based on a cross-domain loss, a clustering loss, and a triplet loss:
         a feature extractor comprising at least a feature extraction layer of an AI model,
         a location classifier comprising at least a location classifier layer of the AI model, and
         a domain classifier comprising at least a domain classifier layer of the AI model;
      classify, using the location classifier layer of the AI model and based on a first set of feature data from the feature extraction layer, first channel state information (CSI) data to obtain a first estimated location label of a first person in a first environment;

receive, via the WiFi transceiver, second CSI data associated with a second person at a first physical location and a second environment;

obtain, using the feature extraction layer of the AI model and based on operating on the second CSI data, a second set of feature data;

classify, using the location classifier layer of the AI model and based on the second set of feature data from the feature extraction layer, the second CSI data to obtain a second estimated location label of the second person, and output, by a visible indication or an audible indication, an indicator of the second estimated location label of the second person.

29. A non-transitory computer-readable storage medium storing instructions configured to cause a processor to:

jointly train, based on a cross-domain loss, a clustering loss, and a triplet loss:
- a feature extractor comprising at least a feature extraction layer of an AI model,
- a location classifier comprising at least a location classifier layer of the AI model, and
- a domain classifier comprising at least a domain classifier layer of the AI model;

classify, using the location classifier layer of the AI model and based on a first set of feature data from the feature extraction layer, first channel state information (CSI) data to obtain a first estimated location label of a first person in a first environment;

receive, via a WiFi transceiver, second CSI data associated with a second person at a first physical location and a second environment;

obtain, using the feature extraction layer of the AI model and based on operating on the second CSI data, a second set of feature data;

classify, using the location classifier layer of the AI model and based on the second set of feature data from the feature extraction layer, the second CSI data to obtain a second estimated location label of the second person, and output, by a visible indication or an audible indication, an indicator of the second estimated location label of the second person.

* * * * *